(12) United States Patent
Kondo et al.

(10) Patent No.: US 6,985,186 B2
(45) Date of Patent: Jan. 10, 2006

(54) COEFFICIENT DATA GENERATING APPARATUS AND METHOD, INFORMATION PROCESSING APPARATUS AND METHOD USING THE SAME, COEFFICIENT-GENERATING-DATA GENERATING DEVICE AND METHOD THEREFOR, AND INFORMATION PROVIDING MEDIUM USED THEREWITH

(75) Inventors: Tetsujiro Kondo, Tokyo (JP); Akihiko Arimitsu, Kanagawa (JP); Naoki Fujiwara, Tokyo (JP); Yoshiaki Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 549 days.

(21) Appl. No.: 10/112,411

(22) Filed: Mar. 28, 2002

(65) Prior Publication Data
US 2003/0030749 A1 Feb. 13, 2003

(30) Foreign Application Priority Data
Mar. 29, 2001 (JP) .............................. 2001-097401

(51) Int. Cl.
*H04N 7/01* (2006.01)
(52) U.S. Cl. ..................................... 348/441; 348/448
(58) Field of Classification Search ................ 348/448, 348/452, 458, 441, 443
See application file for complete search history.

(56) References Cited

U.S. PATENT DOCUMENTS

| | | | | |
|---|---|---|---|---|
| 5,132,793 A | * | 7/1992 | Hirahata et al. | ............ 348/556 |
| 5,161,003 A | * | 11/1992 | Yasuki et al. | ................ 348/556 |
| 5,838,381 A | * | 11/1998 | Kasahara et al. | ........... 348/458 |
| 5,933,196 A | * | 8/1999 | Hatano et al. | .............. 348/441 |
| 6,356,310 B1 | * | 3/2002 | Horishi et al. | ............... 348/458 |
| 6,377,307 B1 | * | 4/2002 | Honda | ......................... 348/448 |
| 6,466,269 B1 | * | 10/2002 | Someya et al. | ............. 348/448 |
| 6,597,737 B1 | * | 7/2003 | Kondo et al. | .......... 375/240.12 |
| 6,646,684 B1 | * | 11/2003 | Kondo et al. | ............... 348/447 |

* cited by examiner

*Primary Examiner*—Paulos M. Natnael
(74) *Attorney, Agent, or Firm*—Frommer Lawrence & Haug LLP; William S. Frommer; Darren M. Simon

(57) ABSTRACT

A coefficient data generating apparatus includes a coefficient data generator and an estimation predictive calculation circuit. The coefficient data generator generates for each class coefficient data for an estimation expression which is used to obtain horizontal and vertical resolution corresponding to parameters input from a remote control transmitter by a user. The coefficient data is stored in a coefficient data memory. The estimation predictive calculation circuit generates based on an estimation expression HD pixel data constituting an output picture signal by using other coefficient data read from the coefficient data memory, and SD pixel data of prediction taps. The coefficient data is generated by linearly adding pieces of coefficient-generating data, and the output picture signal can be obtained so as to corresponds to the input parameters. This makes it possible to freely control the resolution of a displayed picture.

30 Claims, 20 Drawing Sheets

FIG. 14
A (BY 1.0) 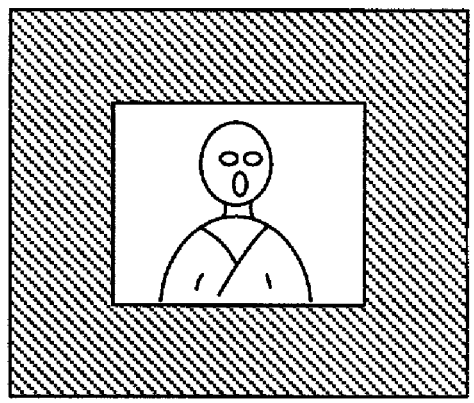 SMALLER PICTURE SIZE
B (BY 1.5) 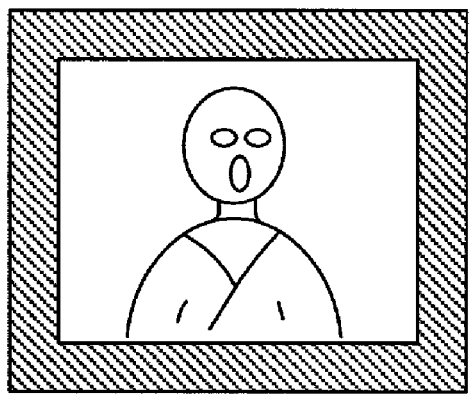 SELECT
C (BY 2.0) 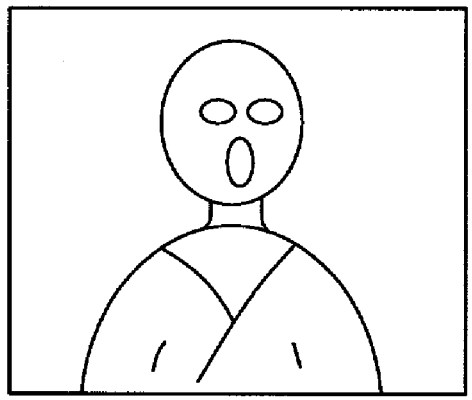 LARGER PICTURE SIZE

US 6,985,186 B2

COEFFICIENT DATA GENERATING APPARATUS AND METHOD, INFORMATION PROCESSING APPARATUS AND METHOD USING THE SAME, COEFFICIENT-GENERATING-DATA GENERATING DEVICE AND METHOD THEREFOR, AND INFORMATION PROVIDING MEDIUM USED THEREWITH

BACKGROUND OF THE INVENTION

1. Field of the Invention

The present invention relates to a coefficient data generating apparatus and method suitable for conversion of NTSC video signals into, for example, high-definition-television (HDTV) video signals, an information-signal conversion apparatus and method using the coefficient data generating apparatus and method, a coefficient-generating-data generating device and method for use in the information-signal conversion apparatus and method, and an information providing medium used therewith. In particular, the present invention relates to a coefficient data generating apparatus and method in which, in accordance with conversion relationships representing relationships between input information signals and output information signals, that is, relationships between signals generated by linearly transforming a predetermined number of learning signals and signals generated by linearly transforming a predetermined number of training signals, by performing operations using pieces of coefficient-generating data which are those in an estimation expression for use in conversions of the learning signals into the training signals that respectively correspond to combinations of the learning signals and the training signals, coefficient data in an estimation expression used when converting the input information signals into the output input signals can be generated. The generated coefficient data is similar to that obtained in actual learning using the learning signals and the training signals.

2. Description of the Related Art

Conventionally, for example, format conversion that converts a 525i signal as a standard definition (SD) signal into a 1050i signal as a high definition (HD) signal has been proposed. A 525i signal represents an interlaced picture signal for the case of using 525 lines, and a 1050i signal represents an interlaced picture signal for the case of using 1050 lines.

FIG. 20 shows positional relationship in pixels between 525i signals and 1050i signals. The larger dots indicate 525i-signal pixels, and the smaller dots indicate 1050i-signal pixels. Pixel positions in odd fields are indicated by the solid lines, and pixel positions in even fields are indicated by the broken lines. To convert a 525i signal into a 1050i signal, four 1050i-signal pixels must be obtained for one 525i-signal pixel in each of the odd and even fields.

In a method of the related art, in order to perform such format conversion, when obtaining 1050i-signal pixel data from 525i-signal pixel data, estimation-expression coefficient data corresponding to the phase of each 1050i-siganl pixel corresponding to each 525i-signal pixel is stored in a memory, and 1050i-siganl pixel data is obtained by the estimation expressing using the coefficient data.

In the above method that finds 1050i-siganl pixel data by using the estimation expression, the resolution of a picture based on the 1050i signals is fixed and cannot be changed to a desired resolution in accordance with the content of the picture differently form conventional adjustment of contract and sharpness.

SUMMARY OF THE INVENTION

It is an object of the present invention to provide an apparatus and method for freely adjusting picture resolution without increasing the number of pieces of estimation-expression coefficient data that are stored in storage.

It is another object of the present invention to provide an apparatus and method for freely controlling picture size and a sampling frequency of an audio signal without increasing the number of pieces of estimation-expression coefficient data that are stored in storage.

To these ends, according to an aspect of the present invention, the foregoing objects are achieved through provision of a coefficient data generating apparatus for generating pieces of coefficient data for an estimation expression which are used when an input information signal composed of pieces of data is converted into an output information signal composed of pieces of data. The coefficient data generating apparatus includes a storage unit which stores coefficient-generating data for generating estimation-expression coefficient data which is used when a predetermined number of learning signals are converted into a predetermined number of training signals so that each piece of the coefficient-generating data corresponds to each of combinations of the learning signals and the training signals, a transformation-relationship specifying unit which represents relationships between the learning signals and the training signals in the form of transformation relationships representing relationships between signals generated by linearly transforming the learning signals and signals generated by linearly transforming the training signals, and which specifies each of the transformation relationships, and a coefficient generating unit which, by performing calculation using pieces of the coefficient-generating data stored in the storage unit, in accordance with the transformation relationships, generates the coefficient data for the estimation expression which are used when the input information signal is converted into the output information signal.

According to another aspect of the present invention, the foregoing objects are achieved through provision of a coefficient data generating method for generating pieces of coefficient data for an estimation expression which are used when an input information signal composed of pieces of data is converted into an output information signal composed of pieces of data. The coefficient data generating method includes the steps of representing a relationship between the input information signal and the output information signal by using transformation relationships representing relationships between signals generated by linearly transforming a predetermined number of learning signals and signals generated by linearly transforming a predetermined number of training signals, and specifying each of the transformation relationships, and by performing calculation using pieces of coefficient-generating data for generating pieces of estimation-expression coefficient data which are used when the learning signals are converted into the training signals in accordance with combinations of the learning signals and the training signals, generating the pieces of coefficient data for the estimation expression which are used when the input information signal is converted into the output information signal.

According to another aspect of the present invention, the foregoing objects are achieved through provision of an information providing medium for providing a computer program for executing a process for generating pieces of coefficient data for an estimation expression which are used when an input information signal composed of pieces of data is converted into an output information signal composed of pieces of data. The process includes the steps of representing a relationship between the input information signal and the output information signal by using transformation relationships representing relationships between signals generated by linearly transforming a predetermined number of learning signals and signals generated by linearly transforming a predetermined number of training signals, and specifying each of the transformation relationships, and by performing calculation using pieces of coefficient-generating data for generating pieces of estimation-expression coefficient data which are used when the learning signals are converted into the training signals in accordance with combinations of the learning signals and the training signals, generating the pieces of coefficient data for the estimation expression which are used when the input information signal is converted into the output information signal.

According to another aspect of the present invention, the foregoing objects are achieved through provision of an information signal processing apparatus for converting a first information signal composed of pieces of input data into a second information signal composed of pieces of data. The information signal processing apparatus includes a first extraction unit which, from the first information signal, extracts first data adjacent to data of interest corresponding to the second information signal, a parameter input unit from which the value of a parameter representing a relationship between the first information signal and the second information signal is input, a coefficient-data generating device which retains pieces of coefficient-generating data and which, by linearly adding the pieces of coefficient-generating data, generates pieces of coefficient data for an estimation expression which are used when the first information signal is converted into the second information signal so that the generated coefficient data corresponds to the value of the parameter, and a calculation unit which generates the second information signal by using the estimation expression to perform calculation using the coefficient data and the first data.

According to another aspect of the present invention, the foregoing objects are achieved through provision of an information-signal processing method for converting a first information signal composed of pieces of input data into a second information signal composed of pieces of data. The information-signal processing method includes the steps of extracting, from the first information signal, data adjacent to data of interest corresponding to the second information signal, generating, by linearly adding the pieces of coefficient-generating data, pieces of coefficient data for an estimation expression which are used when the first information signal is converted into the second information signal so that the generated coefficient data corresponds to the value of the parameter, and generating the second information signal by using the estimation expression to perform calculation using the generated coefficient data and the extracted data.

According to another aspect of the present invention, the foregoing objects are achieved through provision of a coefficient-generating-data generating method for generating coefficient-generating data for use in obtaining pieces of coefficient data for an estimation expression which are used when a first information signal composed of pieces of input data is converted into a second information signal composed of pieces of data. The coefficient-generating-data generating method includes the steps of obtaining a predetermined number of training signals corresponding to the second information signal, obtaining a predetermined number of learning signals corresponding to the first information signal, and generating the coefficient-generating data for generating the pieces of coefficient data for the estimation expression which are used when the first information signal is converted into the second information signal so that the pieces of the generated coefficient-generating data respectively correspond to combinations of the learning signals and the training signals.

According to another aspect of the present invention, the foregoing objects are achieved through provision of an information providing medium for providing a computer program for executing a process for generating coefficient-generating data for use in obtaining pieces of pieces of coefficient data for an estimation expression which are used when a first information signal composed of pieces of input data is converted into a second information signal composed of pieces of data. The process includes the steps of obtaining a predetermined number of training signals corresponding to the second information signal, obtaining a predetermined number of learning signals corresponding to the first information signal, and generating the coefficient-generating data for generating the pieces of coefficient data for the estimation expression which are used when the first information signal is converted into the second information signal so that the pieces of the generated coefficient-generating data respectively correspond to combinations of the learning signals and the training signals.

According to the present invention, pieces of coefficient data for an estimation expression which are used when a first information signal is converted into a second interface is generated by linearly adding pieces of coefficient-generating data so that the generated coefficient data corresponds to an input value of a parameter, and a second information signal corresponding to the input value of the parameter can be obtained. This makes it possible to freely control a picture resolution, a picture size, a sampling frequency for an audio signal, etc.

In addition, according to the present invention, in accordance with transformation relationships which represent relationship between an input information signal and an output information signal and which are relationships between signals generated by linearly transforming a predetermined number of learning signals and signals generated by linearly transforming a predetermined number of training signals, by performing calculation using coefficient-generating data for an estimation expression which are used when the learning signals are converted into the training signals which respectively correspond to combinations of the learning signals and the training signals, coefficient data for the estimation expression which are used when the input information signal is converted into the output information signal is generated. Accordingly, data similar to that obtained in learning actually using the learning signals and the training signals can be obtained as the coefficient data for the estimation expression which are used when the input information signal is converted into the output information signal.

BRIEF DESCRIPTION OF THE DRAWINGS

FIG. 14 is an illustration of the sizes of displayed pictures;

DESCRIPTION OF THE PREFERRED EMBODIMENTS

A first embodiment of the present invention is described below.

Figure 1:
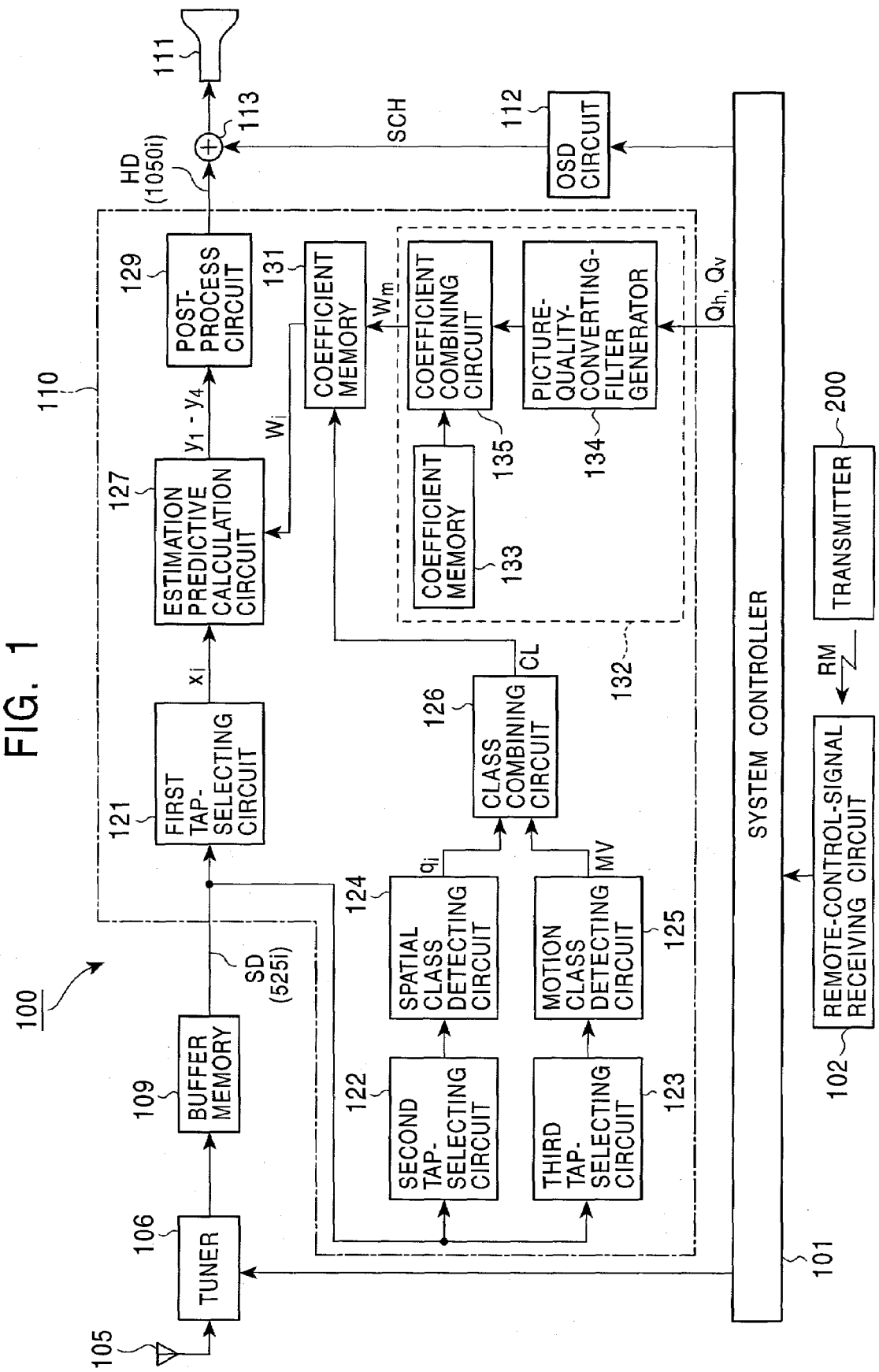
FIG. 1 is a block diagram showing a television receiver according to a first embodiment of the present invention.

FIG. 1 shows the structure of a television (TV) receiver 100 according to the first embodiment. The TV receiver 100 converts a 525i signal as an SD signal obtained from broadcast signals, coverts the 525i signal into a 1050i signal as an HD signal, and displays pictures based on the 1050i signal.

The TV receiver 100 includes microcomputers, specifically, a system controller 101 for controlling the operation of the entire system of the TV receiver 100, and a remote-control-signal receiving circuit 102. The remote-control-signal receiving circuit 102 is connected to the system controller 101. The remote-control-signal receiving circuit 102 receives a remote control signal RM that is output from a remote control transmitter 200 in response to a user's operation, and supplies the system controller 101 with an operation signal corresponding to the remote control signal RM.

The TV receiver 100 also has a receiving antenna 105, a tuner 106 that obtains an SD signal (525i signal) by performing processes, such as selection, intermediate-frequency amplification, and detection on a broadcast signal (RF-modulated signal) captured by the receiving antenna 105, and a buffer memory 109 that temporally stores the SD signal output from the tuner 106.

The TV receiver 100 also includes a picture signal processor 110 for converting the temporarily stored SD signal (525i signal) into an HD signal (1050i signal), a display unit 110 for displaying pictures based on the HD signal output from the picture signal processor 110, an on-screen display (OSD) circuit 112 for generating a display signal SCH for displaying characters, figures, etc., on the screen of the OSD unit 112, and a combining unit 113 that supplies the display unit 111 with a composite signal obtained by combining the display signal SCH with the HD signal output from the picture signal processor 110. As the display unit 111, for example, a cathode-ray tube display, or a flat-panel display such as a liquid crystal display is used.

The operation of the TV receiver 100 shown in FIG. 1 is described below.

The SD signal (525i signal) output from the tuner 106 is supplied and temporarily stored in the buffer memory 109. The temporarily stored SD signal is supplied to the picture signal processor 110, and is converted into an HD signal (1050i signal). In other words, the picture signal processor 110 obtains pixel data (hereinafter referred to as "HD pixel data") constituting the HD signal from pixel data (hereinafter referred to as "SD pixel data") constituting the SD signal. The HD signal output from the picture signal processor 110 is supplied to the display unit 111. A picture based on the HD signal is displayed on the screen of the display unit 111.

A user can control the horizontal and vertical resolutions of the picture displayed by the display unit 111 by, with the remote control transmitter 200, changing the values of parameters $Q_h$ and $Q_v$. When the parameters $Q_h$ and $Q_v$ are changed, their values are displayed on the screen of the display unit 111. In this embodiment, their values are displayed in a form (not shown) such as numeric representation or a bar graph. The user can control the values of the parameters $Q_h$ and $Q_v$ while seeing them.

When the values of the parameters $Q_h$ and $Q_v$ are displayed, the system controller 101 supplies display data to the OSD unit 112. The OSD unit 112 generates a display data SCH based on the display data, and supplies the display data SCH to the display unit 111 via the combining unit 113.

Next, the details of the picture signal processor 110 are described below.

The picture signal processor 110 includes first to third tap-selecting circuits 121 to 123 that, from the SD signal (525i signal) stored in the buffer memory 109, selectively extract pieces of SD pixel data which are adjacent to pixels of interest relating to the HD signal (1050i signal), and output the pieces of SD pixel data.

The first tap-selecting circuit 121 selectively extracts the data of SD pixels (hereinafter referred to as a "prediction tap") for use in prediction. The second tap-selecting circuit 122 selectively extracts the data of SD pixels (hereinafter referred to as a "spatial class tap") for classification adapted for a level distribution pattern of the SD pixel data. The third tap-selecting circuit 123 selectively extracts the data of SD pixels (hereinafter referred to as a "motion class tap") for use in classification adapted for motion. In the case of determining a spatial class by using SD pixel data belonging to a plurality of fields, the spatial class includes motion information.

The picture signal processor 110 includes a spatial class detecting circuit 124 that detects a level distribution pattern of the spatial class tap data (SD pixel data) which is selectively extracted by the second tap-selecting circuit 122, detects a spatial class based on the level distribution pattern, and outputs the information of the class.

The spatial class detecting circuit 124 performs operations for, for example, converting each piece of the SD pixel data from 8-bit form into 2-bit form. Compressed data corresponding to each piece of the SD pixel data is output as class information on the spatial class from the spatial class detecting circuit 124. In the first embodiment, adaptive dynamic range coding (ADRC) is used to perform data compression. A method such as predictive coding or vector quantization other than ADRC may be used as information compression means.

Although ADRC is originally adaptive requantization developed for high efficient coding for use in videocassette recorders, it is suitable for use in the above data compression because it can efficiently express local patterns of a signal level. In the case of using ADRC, when in spatial class tap data (SD pixel data), a maximum value is represented by MAX, a minimum value is represented by MIN, the dynamic range of the spatial class tap data is represented by DR (=MAX−MIN+1), and the number of requantized bits is represented by P, for each piece $k_i$ as spatial class tap data of SD pixel data, a requantized code $q_i$ is obtained as class information of spatial class in the form of compressed data by using the following expression:

$$q_i = [(k_i - \text{MIN} + 0.5) \times 2^P / DR] \quad (1)$$

where the brackets represent truncation processing. When there are Na pieces of SD pixel data as spatial class tap data, i=1 to Na.

The picture signal processor 110 includes a motion class detecting circuit 125 that, based on the data (SD pixel data) of the motion class tap selectively extracted by the third tap-selecting circuit 123, detects a motion class for mainly representing the degree of motion, and outputs the detected class information.

The motion class detecting circuit 125 calculates inter-frame differences using data $m_i$ and $n_i$ (where $n_i$ represents data in a frame different from $m_i$ and corresponds to $m_i$) of the motion class tap selectively extracted by the third tap-selecting circuit 123, and detects a motion class as a motion index by performing threshold processing on the average of the absolute values of the differences. In other words, the motion class detecting circuit 125 calculates the average AV of the absolute values of the differences by using the following expression:

$$AV = \frac{\sum_{i=1}^{N_b} |m_i - n_i|}{N_b} \quad (2)$$

By way of example, when six pieces $m_1$ to $m_6$ of SD pixel data, and six pieces $n_1$ to $n_6$ of SD pixel data in a previous frame are extracted as class tap data by the third tap-selecting circuit 123, $N_b$ in expression (2) is 6.

By comparing the average AV as described above with one or a plurality of threshold values, the motion class detecting circuit 125 obtains class information MV of motion class. For example, in the case of detecting four motion classes by using three threshold values $th_1$, $th_2$, and $th_3$ ($th_1 < th_2 < th_3$), when AV≦$th_1$, MV=0, when $th_1$<AV≦$th_2$, MV=2, and when $th_3$<AV, MV=3.

The picture signal processor 110 includes a class combining circuit 126 that, based on the requantized code $q_i$ output as class information of spatial class from the spatial class detecting circuit 124 and the class information MV of motion class output from the motion class detecting circuit 125, obtains a class code CL representing a class to which a pixel (pixel of interest) based on an HD signal to be created belongs.

The class combining circuit 126 calculates the class code CL by using the following expression:

$$CL = \sum_{i=1}^{Na} q_i (2^P)^{(i-1)} + MV \cdot (2^P)^{Na} \quad (3)$$

where Na represents the number of pieces of spatial class tap data (SD pixel data), and P represents the number of requantized bits in ADRC.

The picture signal processor 110 includes a coefficient memory 131. The coefficient memory 131 stores coefficient data in an estimation expression used in an estimation predictive calculation circuit 127 (described later). The coefficient data is information for converting the SD signal (525i signal) into the HD signal (1050i signal). The class code CL output from the class combining circuit 126 is supplied as read-address information to the coefficient memory 131. Coefficient data $W_i$ corresponding to the class code CL is read from the coefficient memory 131, and is supplied to the estimation predictive calculation circuit 127.

The picture signal processor 110 includes a coefficient generator 132 for generating coefficient data $W_m$ that is stored in the coefficient memory 131. The coefficient generator 132 includes a coefficient memory 133, a picture-quality-converting-filter generator 134, and a coefficient combining circuit 135. Processing for generating the coefficient $W_m$ is performed, for example, for each field in vertical blanking periods.

In the coefficient memory 133, a plurality of pieces of coefficient data are stored beforehand. Here, the pieces of coefficient data are described below.

It is assumed that the estimation predictive calculation circuit 127 (described later) calculates HD pixel data y by using the following expression:

$$y = \sum_{i=1}^{n} W_i \cdot x_i \quad (4)$$

where n represents the number of prediction taps.

The pieces of coefficient data are generated by learning. First, a method for the learning is described below.

Learning is performed for pieces of signal data in units of classes. When the number of piece of data is m, in accordance with expression (4), the following expression is set:

$$y_k = W_1 x_{k1} + W_2 x_{k2} + \ldots + W_n x_{kn} \quad (k=1, 2, \ldots, m) \quad (5)$$

When m>n, coefficient data $w_1$, $w_2$, . . . , $w_n$ are not uniquely determined. Accordingly, by determining elements of error vector e in the following expression (6), coefficient data that minimizes the following expression (7) is found:

$$e_k = y_k + (W_{1 \times k1} + W_{2 \times k2} + \ldots W_{n \times kn}) \quad (k=1, 2, \ldots, m) \quad (6)$$

$$e^2 = \sum_{k=1}^{m} e_k^2 \quad (7)$$

This is a solution using so-called the "least-squares method".

Here, a partial differential coefficient based on each coefficient $w_i$ in expression (7) is found. Accordingly, each coefficient $w_i$ may be found so that the following expression can be equal to zero.

$$\frac{\partial e^2}{\partial W_i} = \sum_{k=1}^{m}\left(\frac{\partial e_k}{\partial W_i}\right)e_k = \sum_{k=1}^{m} 2x_{ki}e_k \qquad (8)$$

By defining Xij and Yi in the following expressions (9) and (10), expression (8) is transformed into the following matrix expression (11).

$$X_{ij} = \sum_{p=1}^{m} x_{pi} x_{pj} \qquad (9)$$

$$Y_i = \sum_{k=1}^{m} x_{ki} y_k \qquad (10)$$

$$\begin{bmatrix} X_{11} & X_{12} & \cdots & X_{1n} \\ X_{21} & X_{22} & \cdots & X_{2n} \\ \vdots & \vdots & \ddots & \vdots \\ X_{m1} & X_{m2} & \cdots & X_{mn} \end{bmatrix} \begin{bmatrix} W_1 \\ W_2 \\ \vdots \\ W_n \end{bmatrix} = \begin{bmatrix} Y_1 \\ Y_2 \\ \vdots \\ Y_m \end{bmatrix} \qquad (11)$$

Expression (11) is generally called a "normalization equation". By solving this normalization equation by using a common matrix solution such as Gauss-Jordan's elimination method, coefficient data $W_i$ can be found.

The coefficient data $W_i$ is used when picture data $(X_i)$ (SD signal in this embodiment) is converted into picture data $(Y_i)$ (HD signal in this embodiment) of different picture quality. A signal (the SD signal) to be converted is called a "learning signal", and a signal (the HD signal) generated by conversion is called a "training signal". By changing combinations of pictures (hereinafter referred to as "training pictures") displayed by the training signal and pictures (leaning pictures) displayed by the learning signal, coefficient data adapted for various picture qualities can be obtained.

Figure 2:
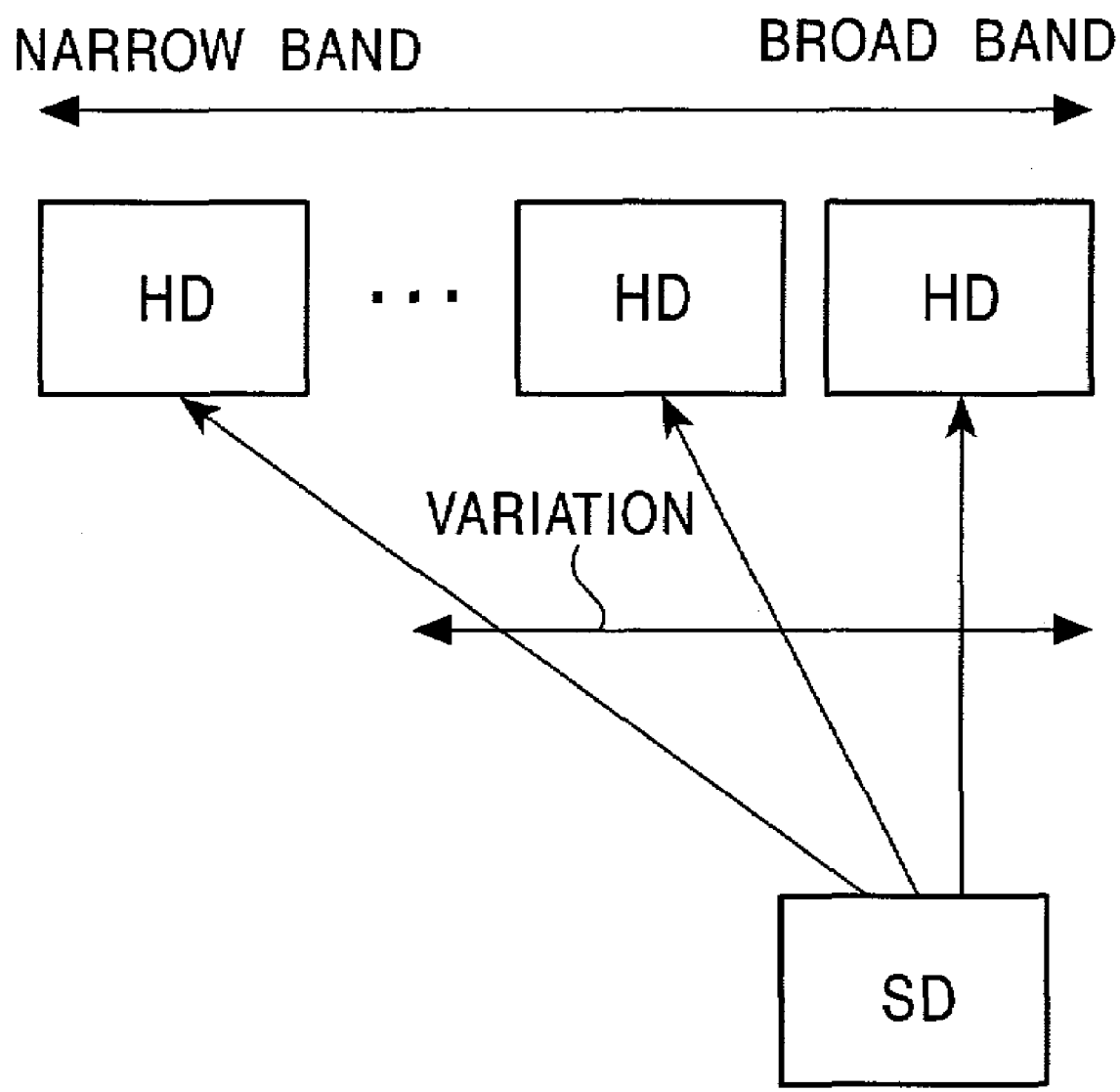
FIG. 2 is an illustration of combinations of training signals and a learning signal.

By correlating a single learning picture with a plurality of training pictures, various combinations of the learning picture with the training pictures can be implemented. In this manner, pieces of coefficient data corresponding to various picture qualities can be obtained. In this embodiment, a case as shown in FIG. 2 is described. In this case, a plurality of HD signals are obtained by combining a reference HD signal with various bandpass filters and are used as training signals, and a fixed SD signal is used as a learning signal. Since the SD signal is fixed, the left side of the normalization equation as expression (11) can be defined by the following expression:

$$A = \begin{bmatrix} X_{11} & X_{12} & \cdots & X_{1n} \\ X_{21} & X_{22} & \cdots & X_{2n} \\ \vdots & \vdots & \ddots & \vdots \\ X_{m1} & X_{m2} & \cdots & X_{mn} \end{bmatrix} \qquad (12)$$

and the normalization equation can be expressed by the following expressions:

$$A\overline{W} = \begin{bmatrix} Y_1 \\ Y_2 \\ \vdots \\ Y_n \end{bmatrix} \qquad (13)$$

$$\overline{W} = A^{-1} \begin{bmatrix} Y_1 \\ Y_2 \\ \vdots \\ Y_n \end{bmatrix} \qquad (14)$$

Figure 3:
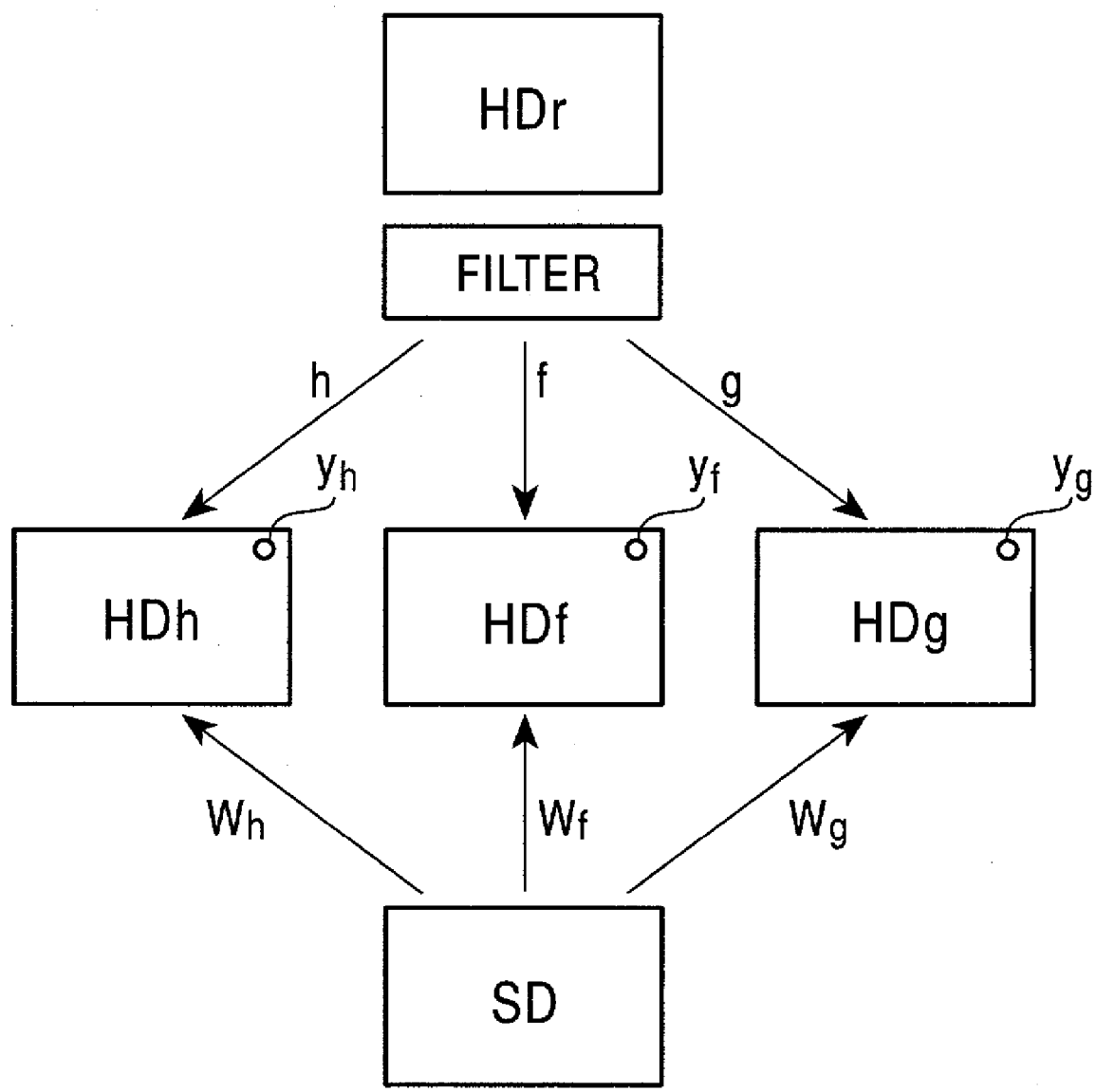
FIG. 3 is an illustration of the images of filters for obtaining a plurality of HD signals.

As FIG. 3 shows, a pixel level based on an HD signal (HDf) obtained by using a combination of a reference HD signal (HDr) and a filter f is defined as $y_f$, and an HD signal (HDg) obtained by using a combination of the reference HD signal (HDr) and a filter g is defined as $y_g$. A pixel level based on an HD signal (HDh) obtained by using a combination of the reference HD signal (HDr) and a linear sum filter h=af+bg of the filters f and g is defined as $y_h$. A coefficient $\overline{Wh}$ which causes $y_h = a \times y_f + b \times y_g$ and which predicts $y_h$ can be expressed by the following expressions:

$$\overline{Wh} = A^{-1}\begin{bmatrix} Y_{h1} \\ Y_{h2} \\ \vdots \\ Y_{hn} \end{bmatrix} = a \times A^{-1}\begin{bmatrix} Y_{f1} \\ Y_{f2} \\ \vdots \\ Y_{fn} \end{bmatrix} + b \times A^{-1}\begin{bmatrix} Y_{g1} \\ Y_{g2} \\ \vdots \\ Y_{gn} \end{bmatrix} \qquad (15)$$

$$\overline{Wh} = a \times \overline{Wf} + b \times \overline{Wg} \qquad (16)$$

This indicates that the HD signal (HDh) can be created from the SD signal by using the HD signal (HDh) obtained by newly combining the filter h, and by using coefficient data $\overline{Wf}$ learned with the HD signal (HDf) obtained by combining the filter f, and coefficient $\overline{Wg}$ learned with the HD signal (HDg) obtained by combining the filter g, without using the learned coefficient data $\overline{Wh}$.

Figure 4:
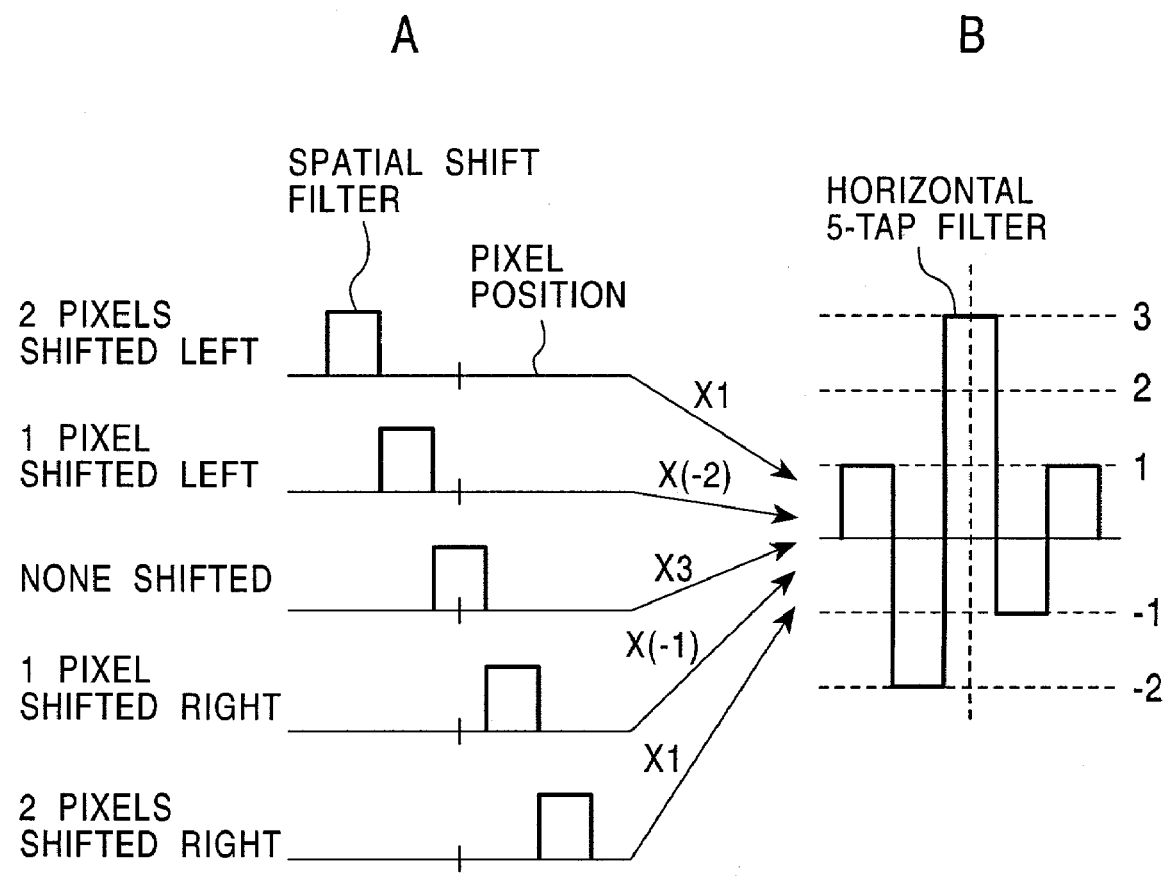
FIG. 4 is an illustration of filter combining from spatial shift filters.

By way of example, as portion (A) FIG. 4 shows, it is assumed that, by using an HD signal that is left shifted by two pixels by a spatial shift filter, an HD signal that is left shifted by one pixel from the reference HD signal by a spatial shift filter, an HD signal that is not shifted from the reference HD signal, an HD signal that is right shifted by one pixel from the reference HD signal, and an HD signal that is right shifted by two pixels from the reference HD signal, five types of coefficient-generating data are obtained (generated) in mutual learning between these HD signals and the SD signal.

As portion (B) of FIG. 4 shows, a horizontal 5-tap filter is represented by the five types of the spatial shift filters. Accordingly, coefficients, obtained in learning between the SD signal and HD signals which are generated by using the horizontal 5-tap filter in the portion (B) of FIG. 4 to convert the reference HD signal can be obtained by using coefficients corresponding to the spatial shift filters as coefficient data. In other words, by using the five types of spatial shift filters, based on the SD signal, an HD signal can be calculated which is similar to an HD signal obtained by combining the reference HD signal with a filter found by an arbitrarily linear sum of the spatial shift filters.

Referring back to FIG. 1, in the first embodiment, in the coefficient memory 133 included in the coefficient data generator 132, five types of coefficient-generating data, $W_L$, $W_O$, $W_R$, $W_U$, and $W_D$ are stored beforehand. Each type of coefficient data has a predetermined number of elements (data) which is equal to the number of prediction taps.

Figure 5:
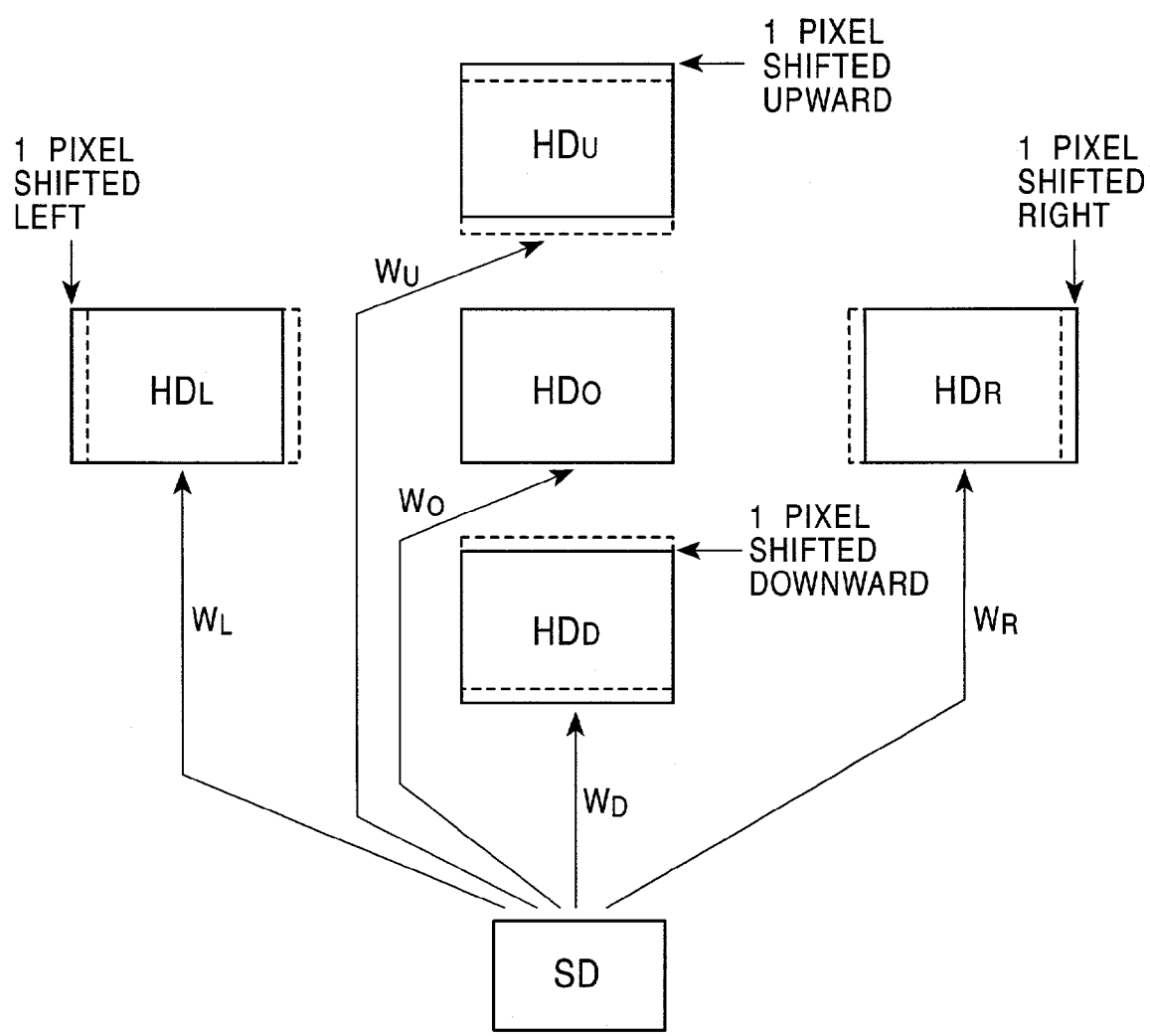
FIG. 5 is an illustration of a method for generating coefficient-generating data.

As FIG. 5 shows, the five types of coefficient-generating data, $W_L$, $W_O$, $W_R$, $W_U$, and $W_D$ are pieces of data for the estimation expression which are generated by obtaining an HD signal ($HD_L$) that is left shifted by one pixel from the reference HD signal, an HD signal ($HD_O$) that is not shifted from the reference HD signal, an HD signal ($HD_R$) that is right shifted by one pixel from the reference HD signal, an HD signal ($HD_U$) that is upwardly shifted by one pixel from the reference HD signal, and an HD signal ($HD_D$) that is downwardly shifted by one pixel from the reference HD signal, and by performing the above learning between each of the HD signals and the SD signal. The SD signal used in this learning is obtained by performing, for example, decimation processing on the reference HD signal.

Each type of the coefficient-generating data has coefficient data in all classes represented by class codes CL. As described above, in the case of converting a 525i signal into a 1050i signal, four pixels of 1050i signal must be generated for one pixel of 525i signal in each of odd and even fields. Accordingly, pieces of coefficient data in a class correspond to four pixels in each 2-by-2-pixel-unit block constituting a 1050i signal in each of the odd and even fields. Each of the four pixels in each 2-by-2-pixel-unit block has a mutually different phase correspondingly to pixels of 525i signal.

The coefficient combining circuit 135 included in the coefficient generator 132 calculates coefficient data $W_m$ by using the five types of coefficient-generating data, $W_L$, $W_O$, $W_R$, $W_U$, and $W_D$, which are stored in the coefficient memory 133, in the following expression:

$$W_m = a_L \cdot W_L + a_O \cdot a_R + aR \cdot W_R + a_U \cdot W_U + a_D \cdot W_D \quad (17)$$

where each of $W_m$, $W_L$, $W_O$, $W_R$, $W_U$, and $W_D$ has a number of elements which is equal to the number of prediction taps (cf., $W_m = w_1, w_2, \ldots, w_n$ where n represents the number of prediction taps).

In other words, the coefficient data $W_m$ can be obtained by linearly adding the five types of coefficient-generating data, $W_L$, $W_O$, $W_R$, $W_U$, and $W_D$.

The picture-quality-converting-filter generator 134 included in the coefficient generator 132 generates coefficients $a_L$, $a_O$, $a_R$, $a_U$, and $a_D$ in expression (17) in response to the value of the parameter $Q_h$ for designating the horizontal resolution and the value of the parameter $Q_v$ for designating the vertical resolution.

The picture-quality-converting-filter generator 134 determines the coefficients $a_L$, $a_O$, $a_R$, $a_U$, and $a_D$ by using a smoothing filter, for example, a Gaussian filter as represented by the following expression:

$$f(r) = (Q/K)^{1/2} \exp(-Qr^2) \quad (18)$$

Figure 6:
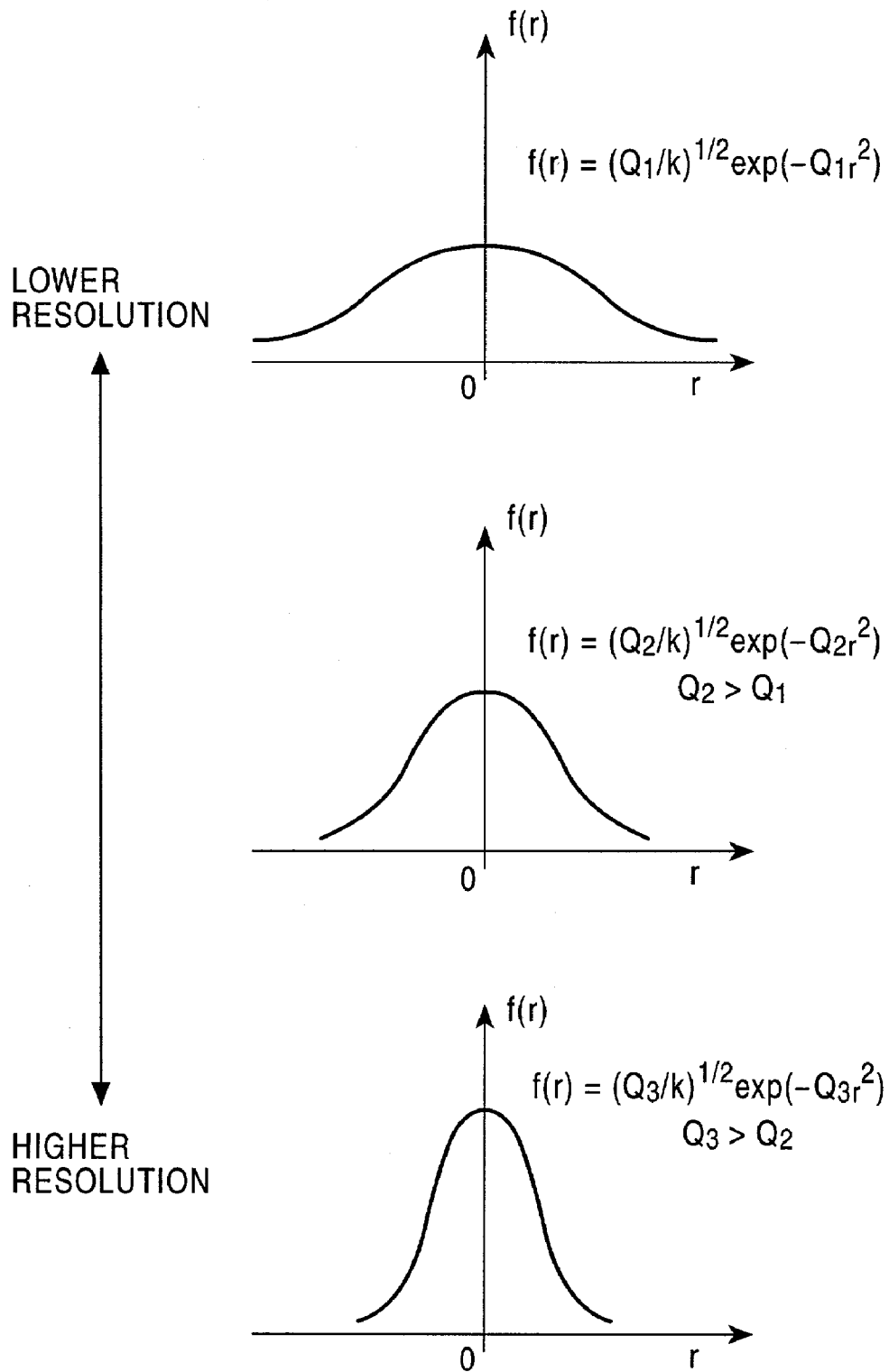
FIG. 6 is an illustration of changes in filter characteristics due to a change in Q.

FIG. 6 shows changes in the characteristics of the Gaussian filter which are obtained when Q in expression (18) is changed to $Q_1$, $Q_2$, and $Q_3$ ($Q_1 < Q_2 < Q_3$). FIG. 6 indicates that the resolution changes depending on the value of Q and indicates that the greater the value of Q increases, the higher the resolution increases.

By putting the parameter $Q_h$ into Q in expression (18), filter characteristics representing a horizontal resolution corresponding to the value of $Q_h$ can be obtained. Similarly, by putting the parameter $Q_v$ into Q in expression (18), filter characteristics representing a vertical resolution corresponding to the value of $Q_v$ can be obtained.

The picture-quality-converting-filter generator 134 normalizes the filter characteristics of either resolution so that a response value in the central pixel position of the filter characteristics representing the horizontal resolution is coincident with a response value in the central pixel position of the filter characteristics representing the vertical resolution. After that, the picture-quality-converting-filter generator 134 determines the coefficients $a_L$, $a_O$, $a_R$, $a_U$, and $a_D$ in proportion to the central pixel position 0 in the filter characteristics representing the horizontal resolution, a position $d_{x_{-1}}$ that is left shifted by one pixel, a position $d_{x_1}$ that is right shifted by one pixel, a position $d_{y1}$ that is upwardly shifted by one pixel in the filter characteristics representing the vertical resolution, and a position $d_{y_{-1}}$ that is downwardly shifted by one pixel. In this case, the sum of the coefficients $a_L$, $a_O$, $a_R$, $a_U$, and $a_D$ is set to be 1.

Figure 7A:
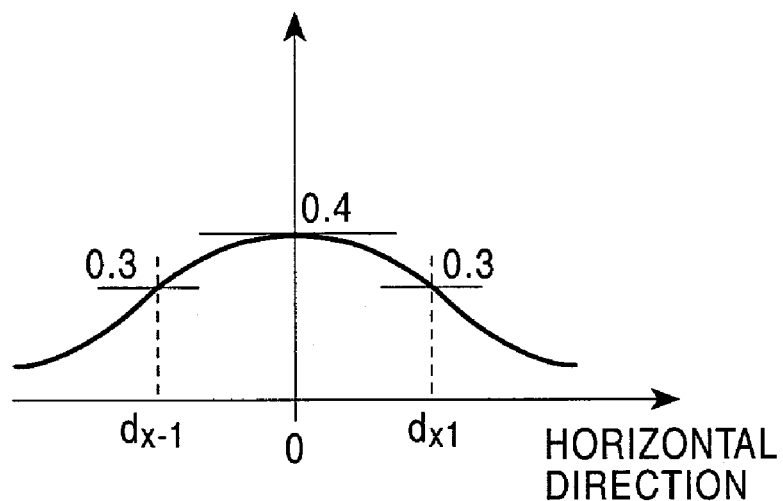
FIGS. 7A and 7B are graphs showing examples of determining coefficients.
Figure 7B:
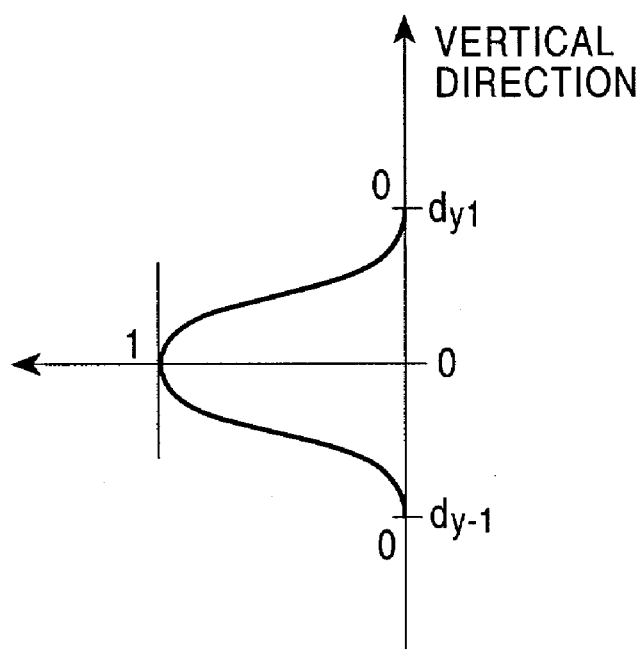

By way of example, when the filter characteristics representing the horizontal resolution are shown in FIG. 7A, and the filter characteristics representing the vertical resolution are show in FIG. 7B, the picture-quality-converting-filter generator 134 determines so that $a_L = 0.3$, $a_O = 0.4$, $a_R = 0.3$, $a_U = 0.0$ and $a_D = 0.0$.

The coefficients $a_L$, $a_O$, $a_R$, $a_U$, and $a_D$ generated by the picture-quality-converting-filter generator 134 are supplied to the coefficient combining circuit 135. The coefficient combining circuit 135 uses expression (17) to find the coefficient data $W_m$ for obtaining the horizontal and vertical resolutions corresponding to the parameters $Q_h$ and $Q_v$. In this case, since the coefficient data $W_L$, $W_O$, $W_R$, $W_U$, and $W_D$ are stored for each class in the coefficient memory 133, the coefficient combining circuit 135 calculates the coefficient data $W_m$ for each class.

Here, the acceptation of the coefficient data $W_m$ is described below with reference to FIG. 8.

Figure 8:
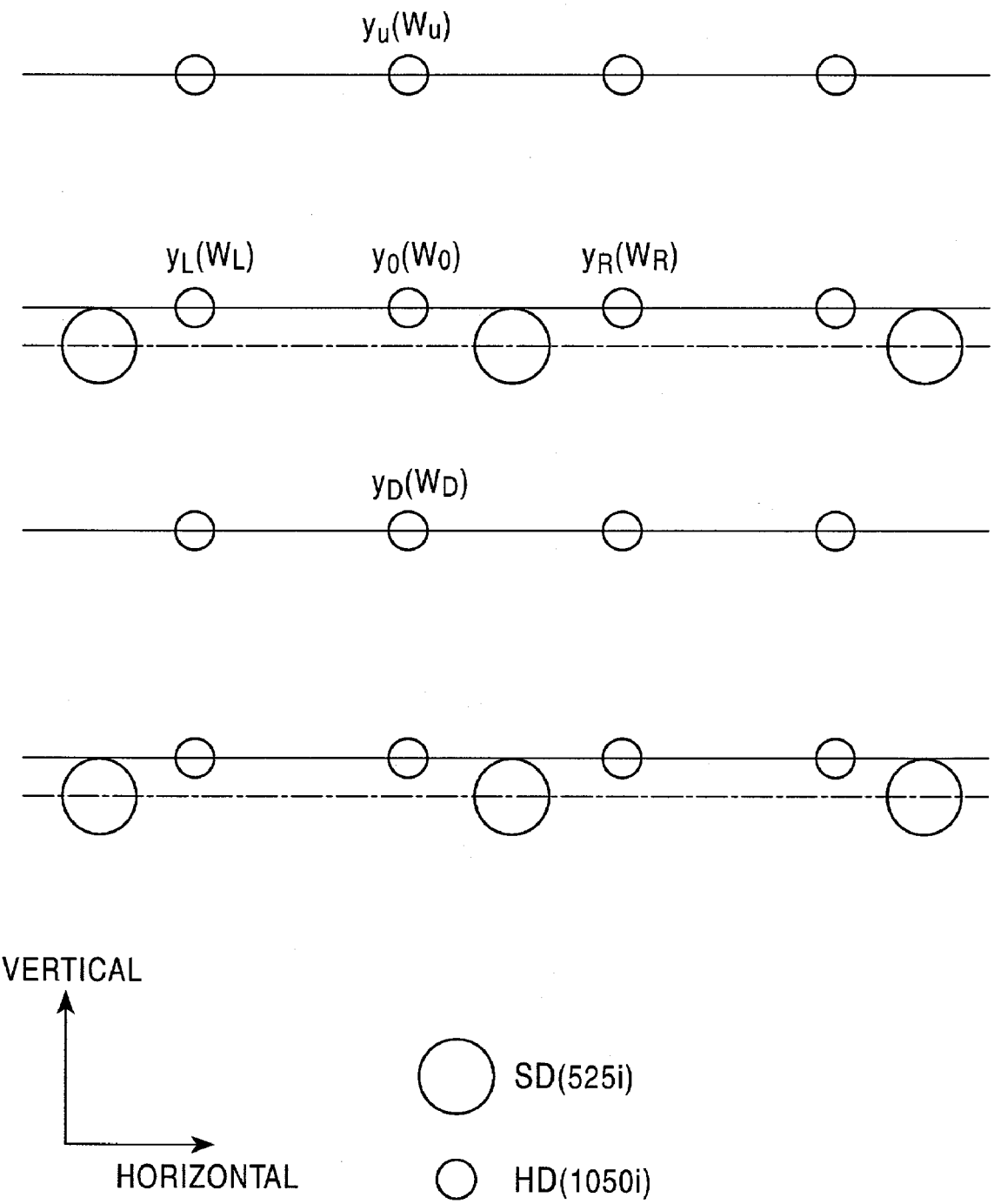
FIG. 8 is an illustration of the acceptation of coefficient data $W_m$.

In FIG. 8, HD pixel data $y_0$ is noted. The coefficient data $W_O$ is originally coefficient data of an estimation expression for calculating the HD pixel data $y_0$ by using the data (SD data) of a predetermined number of prediction taps. The pieces $W_L$, $W_R$, $W_U$, and $W_D$ of coefficient-generating data are pieces of coefficient data for using the data of identical prediction taps to respectively calculate HD pixel data $Y_L$ that is left shifted by one pixel from the HD pixel data $y_O$, HD pixel data $Y_R$ that is right shifted by one pixel, HD pixel data $Y_U$ that is upwardly shifted by one pixel, and HD pixel data $Y_D$ that is downwardly shifted by one pixel.

As described above, the coefficient data $W_m$ is obtained by linearly adding the coefficient data $W_L$, $W_O$, $W_R$, $W_U$, and $W_D$. When the coefficient $W_m$ is used to find the HD pixel data $y_0$, the HD pixel data $y_0$ includes data components of vertically and horizontally adjacent pixels in accordance with the magnitudes of the pieces of coefficient data $W_L$, $W_R$, $W_U$, and $W_D$. Therefore, the smaller the value of the parameter $Q_h$ decreases, the greater the components of the coefficient data $W_R$ and $W_L$ which are included in the coefficient data $W_m$ increase. Thus, the horizontal resolution decreases. Similarly, the smaller the value of the parameter $Q_v$ decreases, the greater the components of the coefficient data $W_U$ and $W_D$ which are included in the coefficient data $W_m$ increase. Thus, the vertical resolution decreases.

Referring back to FIG. 1, the picture signal processor 110 includes the estimation predictive calculation circuit 127. By using data (SD pixel data) $x_i$ of the prediction tap selectively extracted by the first tap-selecting circuit 121, and the coefficient data $W_i$ read from the coefficient memory 131, the estimation predictive calculation circuit 127 calculates data y of a HD-signal pixel (pixel of interest) to be created.

As described above, in the case of converting an SD signal (525i signal) into an HD signal (1050i signal), four pixels of HD signal must be generated for one pixel of SD signal. Accordingly, the estimation predictive calculation circuit 127 generates HD pixel data for each 2-by-2-unit pixel block contents the HD signal.

In other words, prediction tap data $x_i$ corresponding to each of four pixels in a unit-pixel block is supplied from the first tap-selecting circuit 121 to the estimation predictive calculation circuit 127, and coefficient data $W_i$ corresponding to four pixels constituting the unit block is supplied from the coefficient memory 131 to the estimation predictive calculation circuit 127. The data $y_1$ to data $y_4$ of the four pixels constituting the unit-pixel block are separately calculated by expression (4).

The picture signal processor 110 includes a post-process circuit 129 that linearly sequences the data $y_1$ to data $y_4$ of the four pixels constituting each unit-pixel block which are sequentially output from the estimation predictive calculation circuit 127, and outputs the data in 1050i-signal format.

Next, the operation of the picture signal processor 110 is described below.

The second tap-selecting circuit 122 selectively extracts, from the SD signal (525i signal) stored in the buffer memory 109, the data (SD pixel data) of spatial class taps adjacent to four pixels (pixels of interest) in each unit-pixel block constituting the HD signal (1050i signal) to be created. The selectively extracted data (SD pixel data) of spatial class taps are supplied to the spatial class detecting circuit 124. The spatial class detecting circuit 124 obtains the requantized code $q_i$ (see expression (1)) as class information of spatial classes (classification for mainly representing waveform in space) by performing ADRC on SD pixel data as spatial class tap data.

The third tap-selecting circuit 123 selectively extracts, from the SD signal (525i signal) stored in the buffer memory 109, the data (SD pixel data) of spatial class taps adjacent to four pixels (pixels of interest) in each unit-pixel block constituting the HD signal (1050i signal) to be created. The selectively extracted data (SD pixel data) of spatial class taps are supplied to the motion class detecting circuit 125. In the motion class detecting circuit 125, class information MV of motion class (classification for mainly representing the degree of motion) is obtained from the SD data as motion class tap data.

The motion information MV and the requantized code $q_i$ are supplied to the class combining circuit 126. The class combining circuit 126 obtains, from the motion information MV and the requantized code $q_i$, a class code CL representing a class to which four pixels (pixels of interest) in a unit-pixel block belong in each unit-pixel block constituting the HD signal (1050i signal) to be created (see expression (3)). The class code is supplied as read-address information to the coefficient memory 131.

The coefficient memory 131 stores the coefficient data $W_m$ generated in the coefficient data generator 132. In each vertical blanking period, the coefficient data generator 132 generates the coefficient $W_m$ corresponding to the user-adjusted values of parameters $Q_h$ and $Q_v$. In the coefficient data generator 132, the coefficient data $W_m$ of all classes represented by the class code CL. In this case, coefficient data corresponding to the 4 pixels of the 2-by-2-unit pixel block constituting the 1050i signal is generated. As described above, coefficient data for generating coefficient data $W_m$ is stored in the coefficient memory 133 beforehand.

Each class code CL is supplied as read-address information to the coefficient memory 131. The coefficient data $W_i$ corresponding to the class code CL is read from the coefficient memory 131, and is supplied to the estimation predictive calculation circuit 127.

The first tap-selecting circuit 121 selectively extracts, from the SD signal stored in the buffer memory 109, the data (SD pixel data) of prediction taps adjacent to four pixels (pixels of interest) in a unit-pixel block constituting an HD signal to be created. The selectively extracted prediction tap data (SD pixel data) $x_i$ is supplied to the estimation predictive calculation circuit 127.

By using the prediction tap data (SD pixel data) $x_i$ and the coefficient data $W_i$ for four pixels which is read from the coefficient memory 131, the estimation predictive calculation circuit 127 separately calculates each of data $y_1$ to data $y_4$ of the four pixels (pixels of interest) in the unit-pixel block constituting the HD signal to be created (see expression (4)). The data $y_1$ to data $y_4$ of the four pixels which are sequentially output from the estimation predictive calculation circuit 127 are supplied to the post-process circuit 129. The post-process circuit 129 outputs data having a 1050i-signal format by linearly sequencing the sequentially output data $y_1$ to data $y_4$ of the four pixels. In other words, the post-process circuit 129 outputs a 1050i signal as an HD signal.

As described above, the coefficient data generator 132 in the picture signal processor 110 uses the coefficient data stored in the coefficient memory 133 to generate the coefficient data $W_m$ corresponding to the values of the parameters $Q_h$ and $Q_v$. The coefficient data $W_m$ is stored in the coefficient memory 131. By using coefficient data $W_i$ which is read for the class code CL, the estimation predictive calculation circuit 127 calculates HD pixel data y. Therefore, by using the remote control transmitter 220 to change the values of $Q_h$ and $Q_v$, the user can consecutively control the horizontal and vertical resolutions of a picture generated by the HD signal, without storing many pieces of coefficient-generating data in the coefficient memory 133.

The coefficient memory 133 stores as coefficient-generating data the pieces of the coefficient data which are obtained in learning between the HD signals obtained by using the spatial shift filters and the fixed SD signal. The coefficient data generator 132 uses a linear sum of types of coefficient data to generate the coefficient data $W_m$ for obtaining HD pixel data relating to an HD signal to be created. Thus, the generated coefficient data $W_m$ is similar to that obtained in learning between the fixed SD signal and each HD signal to be generated, so that the HD signal can be created with high precision.

Although the TV receiver 100 shown in FIG. 1 stores five types of coefficient-generating data $W_L$, $W_O$, $W_R$, $W_U$, and $W_D$, and finds the coefficient data $W_m$ by linearly adding the five types of coefficient-generating data, it can find the coefficient data $W_m$ by using more types of coefficient data, so that the precision of the coefficient data $W_m$ can be increased.

In the TV receiver 100 shown in FIG. 1, the coefficient data obtained in learning between the HD signals shifted by using the spatial shift filters and the fixed SD signal is used while being stored as coefficient-generating data in the coefficient memory 133. However, if the linearity of coefficient data holds, coefficient data obtained in learning between a plurality of HD signals shifted by spatial shift filters and a fixed HD signal, or coefficient data obtained in learning using combinations of a plurality of HD signals and a plurality of SD signals can be used while being stored in the coefficient memory 133.

In the above embodiment, a case in which a linear equation is used as the estimation expression for generating the HD signal has been described. However, the estimation expression is not limited to the linear equation. For example, an equation of higher degree may be used as the estimation expression.

In the above embodiment, a case in which the SD signal (525i signal) is converted into the HD signal (525p signal or 1050i signal) has been described. However, the present invention is not limited to the case. Definitely, the present invention can be similarly applied to other cases such as the conversion using an estimation expression of a first picture signal into a second picture signal.

Figure 9:
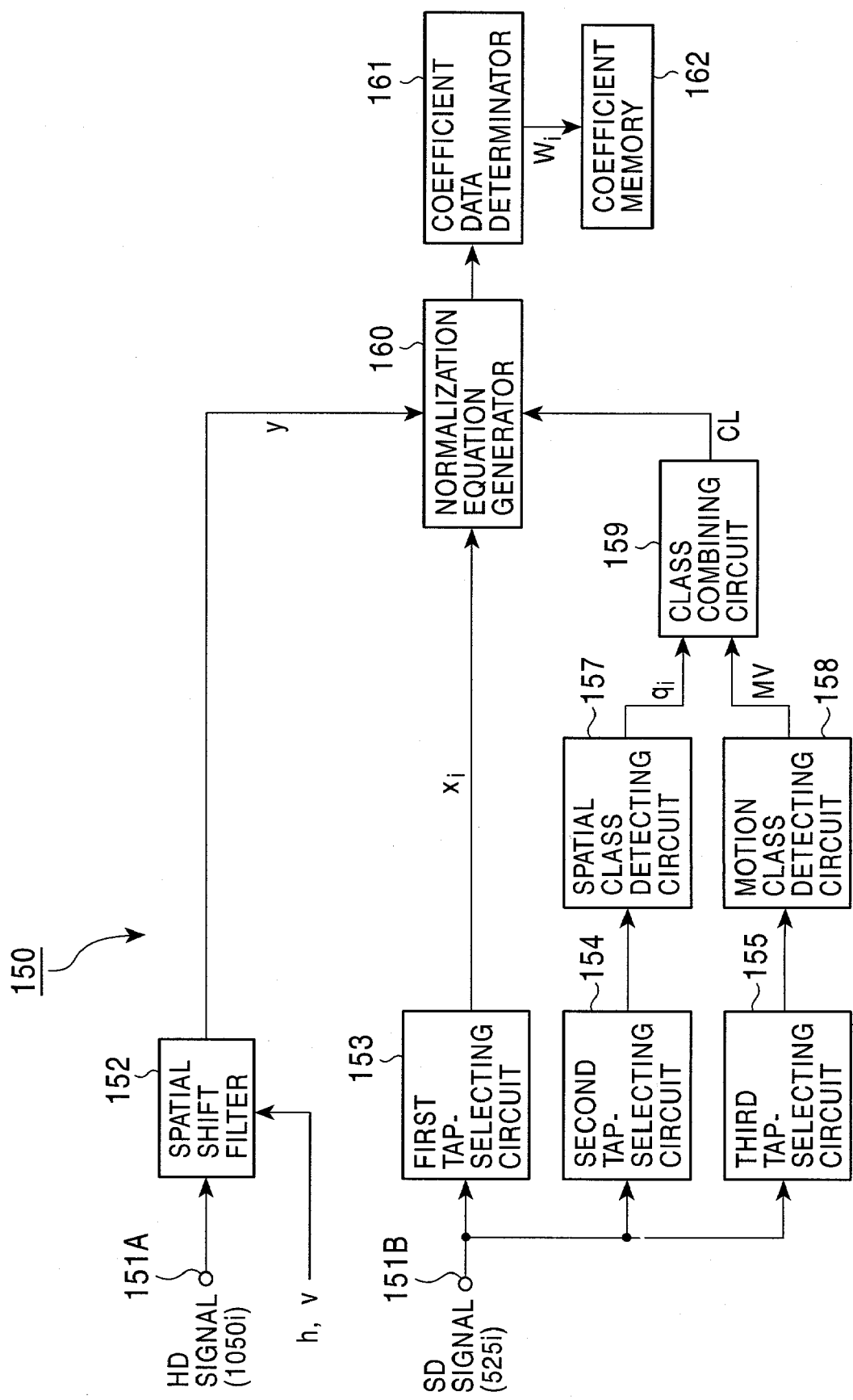
FIG. 9 is a block diagram showing a coefficient data generator.

As described above, the five types of coefficient-generating data, $W_L$, $W_O$, $W_R$, $W_U$, and $W_D$ which are stored in the coefficient memory 133 are generated by the coefficient data generator 150 shown in FIG. 9. The coefficient data generator 150 is described below.

The coefficient data generator 150 has an input terminal 151A to which a reference HD signal (1050i signal) is input, a spatial shift filter 152 that obtains a plurality of HD signals ($HD_L$, $HD_O$, $HD_R$, $HD_U$, and $HD_D$ in FIG. 5) as training signals from the reference HD signal, and an input terminal 151B to which a fixed SD signal (525i signal) is input as a learning signal.

Control signals h and v for respectively designating a horizontal shift and a vertical shift from the reference HD signal are supplied to the spatial shift filter 152. The fixed SD signal is obtained by performing decimation processing on the reference HD signal.

The coefficient data generator 150 includes first to third tap-selecting circuits 153 to 155 that, from the SD signal (525i signal) supplied from the input terminal 151B, selectively extract pieces of SD pixel data which are adjacent to pixels of interest based on the HD signal (1050i signal). The first to third tap-selecting circuits 153 to 155 are similar in structure to the first to third tap-selecting circuits 121 to 123 in the picture signal processor 110.

The coefficient data generator 150 includes a spatial class detecting circuit 157 that performs detection of a level distribution pattern of the data (SD pixel data) of the spatial class tap selectively extracted by the second tap-selecting circuit 154, detection of a spatial class based on the level distribution pattern, and outputting of the class information of the spatial class. The spatial class detecting circuit 157 is similar in structure to the spatial class detecting circuit 124. The spatial class detecting circuit 157 outputs as class information representing a spatial class the requantized code $q_i$ of each piece of SD pixel data as spatial class tap data.

The coefficient data generator 150 includes a motion class detecting circuit 158 that performs detection of a motion class from the data (SD pixel data) of a motion class tap selectively extracted by the third tap-selecting circuit 155, and outputting of the class information MV of the motion class. The motion class detecting circuit 158 is similar in structure to the motion class detecting circuit 125 in the picture signal processor 110. The motion class detecting circuit 158 calculates interframe differences by using the data (SD pixel data) of a motion class tap selectively extracted by the third tap-selecting circuit 155, and detects a motion class by performing threshold processing on the average of the calculated differences.

The coefficient data generator 150 includes a class-combining circuit 159. Based on the requantized code $q_i$ as the class information of the spatial class output from the spatial class detecting circuit 157 and the class information MV output from the motion class detecting circuit 158, the class-combining circuit 159 obtains the class code CL representing the class to which the pixels of interest based on the HD signal (1050i signal) belong. The class-combining circuit 159 is similar in structure to the class combining circuit 126 in the picture signal processor 110.

The coefficient data generator 150 includes a normalization equation generator 160. The normalization equation generator 160 generates a normalization equation (see expression (11)) for obtaining n pieces of coefficient data $W_i$ for each class by using each piece of HD pixel data y as data of pixels of interest which is obtained from the HD signal output from the spatial shift filter 152, data $x_i$ corresponding to the HD pixel data y of the prediction tap which is selectively extracted by the first tap-selecting circuit 153, and the class code CL which corresponds to the HD pixel data y and which is output from the class combining circuit 159.

In this case, a combination of one piece of the HD pixel data y and n pieces of prediction-tap pixel data which correspond to the one piece is used to generate learning data. Thus, the normalization equation generator 160 generates a normalization equation in which many pieces of learning data are recorded. By providing a time-adjusting delay circuit (not shown) in a stage before the first tap-selecting circuit 153, timing with which the SD pixel data $x_i$ is supplied to the normalization equation generator 160 is adjusted.

The coefficient data generator 150 includes a coefficient data determinator 161 and a coefficient memory 162. The coefficient data determinator 161 is supplied with the normalization equation data generated for each class by the normalization equation generator 160, and finds the coefficient data $W_i$ for each class by solving the normalization equation. The coefficient memory 162 stores the coefficient data $W_i$ as types of coefficient data. The coefficient data determinator 161 finds the coefficient data $W_i$ by using Gauss-Jordan's elimination method to solve the normalization equation.

The operation of the coefficient data generator 150 (shown in FIG. 9) is described below.

The reference HD signal (1050i signal) is supplied to the input terminal 151A. The spatial shift filter 152 generates an HD signal as a training signal by performing pixel-shifting processing on the reference HD signal. The control signals h and v for respectively designating a horizontal shift and a vertical shift from the reference HD signal are supplied to the spatial shift filter 152, and the spatial shift filter 152 sequentially generates a plurality of HD signals in which the horizontal shift and the vertical shift gradually change.

The fixed SD signal (525i signal) is supplied to the input terminal 151B. The second tap-selecting circuit 154 selectively extracts from the supplied SD signal the data (SD pixel data) of spatial class taps adjacent to pixels of interest based on an HD signal (1050i signal). The selectively extracted spatial tap data is supplied to the spatial class detecting circuit 157. The spatial class detecting circuit 157 obtains the requantized code $q_i$ as class information of the spatial class by performing ADRC on each piece of the SD pixel data (see expression (1)).

From the SD signal input to the input terminal 151B, the data (SD pixel data) of motion class taps adjacent to pixels of interest based on an HD signal is selectively extracted by the third tap-selecting circuit 155. The selectively extracted motion-class-tap data is supplied to the motion class detecting circuit 158. The motion class detecting circuit 158 obtains class information MV of motion class from each piece of the SD pixel data as the motion class tap data.

The motion information MV and the above requantized code $q_i$ is supplied to the class combining circuit 159. From the motion information MV and the requantized code $q_i$, the class combining circuit 159 obtains the class code CL (see expression (3)) representing the class to which the pixels of interest based on the HD signal belong.

From the SD signal input to the input terminal 151B, the data (SD pixel data) of prediction taps adjacent to pixels of interest based on the HD signal is selectively extracted by the first tap-selecting circuit 153. By using each piece of the HD pixel data y obtained from the HD signal output from the spatial shift filter 152, each corresponding piece of the data (SD pixel data) of the prediction tap selectively extracted by the first tap-selecting circuit 121, and each class code CL which corresponds to the piece of the HD pixel data y and which is output from the class combining circuit 159, the normalization equation generator 160 generates the normalization equation for generating n pieces of coefficient data $W_i$.

After that, the normalization equation is solved by the coefficient data determinator 161, whereby the coefficient data $W_i$ for each class is found. The coefficient data $W_i$ is stored as coefficient-generating data in the coefficient memory 162, which has addresses divided in units of classes.

As described above, the coefficient data generator 150 shown in FIG. 9 generates the coefficient data $W_i$ that is stored as coefficient-generating data in the coefficient data memory 133 in the picture signal processor 110 shown in FIG. 1. In this case, by using the control signals h and v to sequentially change the amount of shifting pixels based on the HD signal which is output from the spatial shift filter 152, a plurality of types (see $W_L$, $W_O$, $W_R$, $W_U$, and $W_D$ in FIG. 5) of coefficient data can be obtained.

Next, a second embodiment of the present invention is described below with reference to FIG. 10.

Figure 10:
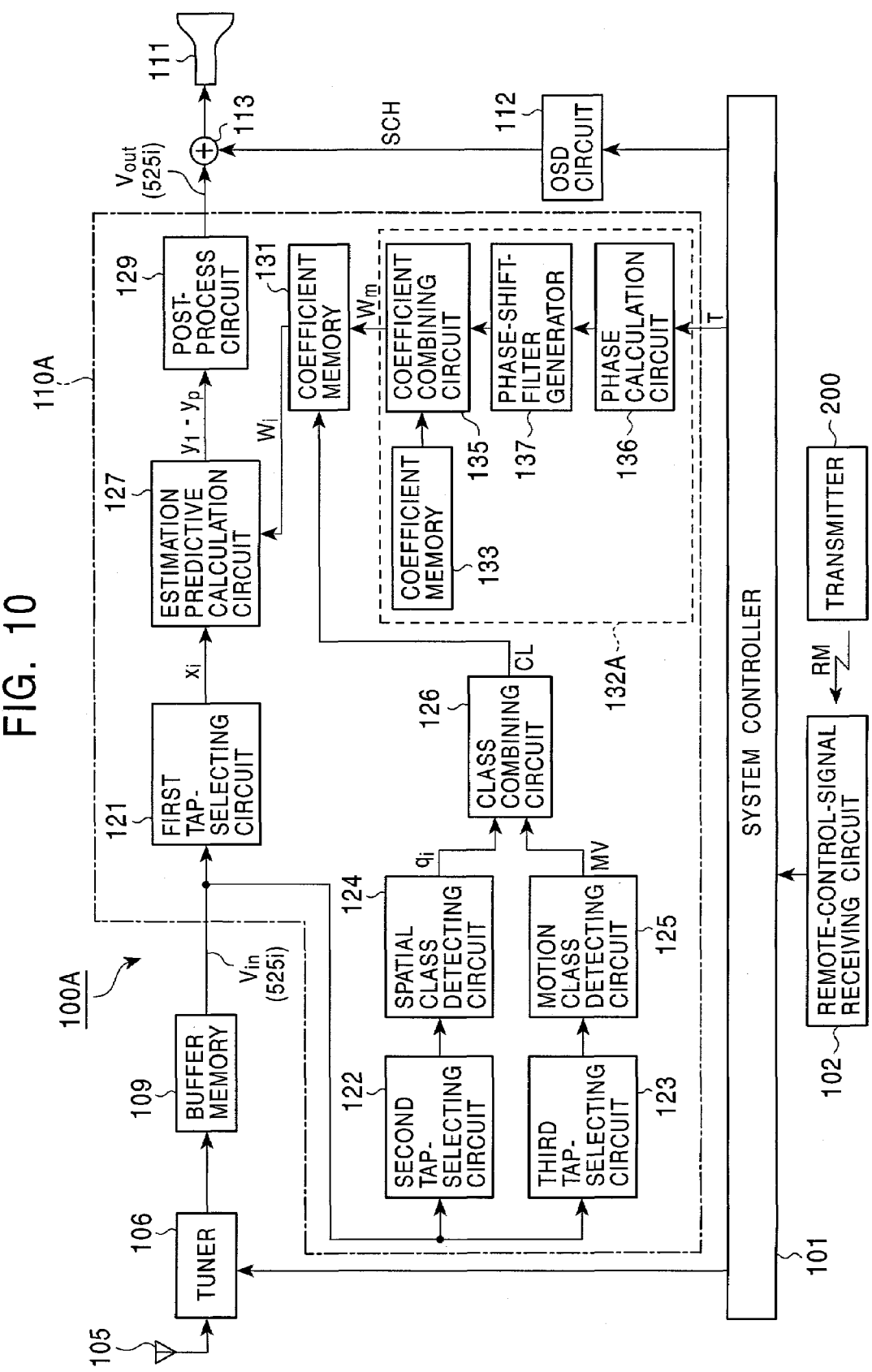
FIG. 10 is a block diagram showing a TV receiver according to a second embodiment of the present invention.

FIG. 10 shows the structure of a TV receiver 100A according to the second embodiment. The TV receiver 100A receives a 525i signal from a broadcast signal, converts the received signal into a new 525i signal for use in displaying a portion of a picture in enlarged form at an arbitrary magnification, and displays a screen based on the new 525i signal. In FIG. 10, portions corresponding to those shown in FIG. 1 are denoted by identical reference numerals, and the description thereof is omitted.

The TV receiver 110A includes microcomputers, that is, a system controller 101 for controlling the entire system of the TV receiver 110A, and a remote-control-signal receiving circuit 102 for receiving the remote control signal. The remote-control-signal receiving circuit 102 is connected to the system controller 101. The remote-control-signal receiving circuit 102 can receive a remote control signal RM output from a remote control transmitter 200 in response to a user's operation, and can supply the system controller 101 with an operation signal corresponding to the remote control signal RM.

The TV receiver 100 also has a receiving antenna 105, a tuner 106 that obtains an SD signal (525i signal) by performing processes, such as selection, intermediate-frequency amplification, and detection on a broadcast signal (RF-modulated signal) captured by the receiving antenna 105, and a buffer memory 109 that temporally stores the SD signal output from the tuner 106.

The TV receiver 100A includes a picture signal processor 110A and a display unit 111. The picture signal processor 110A uses, as an input picture signal $V_{in}$, the 525i signal temporarily stored in the buffer memory 109, converts the input picture signal $V_{in}$ into a new 525i signal for displaying a portion of a picture based on the stored 525i signal in enlarged form at an arbitrary magnification, and outputs the new 525i signal as an output picture signal $V_{out}$. The display unit 111 displays a picture based on the output picture signal $V_{out}$.

The operation of the TV receiver 100A shown in FIG. 10 is described below.

The 525i signal from the tuner 106 is supplied and temporarily stored in the buffer memory 109. The temporarily stored 525i signal is input as the input picture signal $V_{in}$ to the picture signal processor 110A.

The picture signal processor 110A converts the 525i signal into the new 525i signal for displaying the portion of the picture based on the stored 525i signal in enlarged form at the arbitrary magnification. The output picture signal Vout is supplied to the display unit 111, and the picture based on the output picture signal Vout is displayed on the screen of the display unit 111.

The user can control the size of the screen by using the remote control transmitter 200 to change the value of a parameter T for designating the magnification of the displayed screen, although this is not described. In the case of controlling the picture size, the screen of the display unit 111 displays the representation of the parameter T in a form such as a numeric value or a bar graph. The user can control the value of the parameter T while seeing the representation.

When the value of the parameter T is displayed as described above on the screen of the display unit 111, the system controller 101 supplies display data to an OSD circuit 112. The OSD circuit 112 generates a display signal SCH based on the display data and outputs the display signal SCH to the display unit 111 via a combining unit 113.

Next, the picture signal processor 110A is further described below.

The picture signal processor 110A includes a coefficient data generator 132A for generating the coefficient data $W_m$ that is stored in the coefficient memory 131. The coefficient data generator 132A includes a coefficient memory 133, a phase calculation circuit 136, a phase-shift-filter generator 137, and a coefficient combining circuit 135. In the coefficient data generator 132A, processing for generating the coefficient data $W_m$ is performed in vertical blanking periods, for example, for each field.

In the coefficient memory 133, five types of coefficient-generating data, $W_L$, $W_O$, $W_R$, $W_U$, and $W_D$, which are similar to those in the coefficient data generator 132 shown in FIG. 1, and coefficient-generating data, $W_{LU}$, $W_{RU}$, $W_{LD}$, and $W_{RD}$ are stored beforehand. The coefficient data $W_{LU}$ is obtained in learning between an HD signal that is left shifted by one pixel from the reference HD signal and an SD signal that is upwardly shifted by one pixel from the reference HD signal. The coefficient data $W_{RU}$ is obtained in learning between an HD signal that is right shifted by one pixel from the reference HD signal and an SD signal that is upwardly shifted by one pixel from the reference HD signal. The coefficient data $W_{LD}$ is obtained in learning between an HD signal that is left shifted by one pixel from the reference HD signal and an SD signal that is downwardly shifted by one pixel from the reference HD signal. The coefficient data $W_{RD}$ is obtained in learning between an HD signal that is right shifted by one pixel from the reference HD signal and an SD signal that is downwardly shifted by one pixel from the reference HD signal.

Here, correspondence between the input picture signal $V_{in}$ and the output picture signal $V_{out}$ is described below.

The correspondence changes depending on the magnification of the displayed picture. For example, when the magnification of the displayed picture is 1.0 times, 1.5 times, and 2.0 times, a 2-by-2-pixel block based on the input picture signal $V_{in}$ corresponds to 2-by-2-pixel block, a 3-by-3-pixel block, and a 4-by-4-pixel block, respectively.

As described above, when the magnification of the displayed picture is 1.0 times, 1.5 times, and 2.0 times, the number of pixels of the unit block based on the output picture signal $V_{out}$ corresponding to the 2-by-2-pixel block based on the input picture signal $V_{in}$ changes, and the phase to the pixels based on the input picture signal $V_{in}$ of each pixel included in the pixel unit block based on the output picture signal $V_{out}$ also changes.

In the second embodiment, the magnification of the displayed picture can be changed to 1.0 times, 1.5 times, and 2.0 times, as shown in FIG. 14, although this is not described above. In response to the value of the parameter T designating the magnification of the displayed picture, the phase information $t_x$ and $t_y$ of each pixel included in the pixel unit block based on the output picture signal $V_{out}$ is calculated by the phase calculation circuit 136. The phase calculation circuit 136 is formed by, for example, a ROM table.

Figure 11:
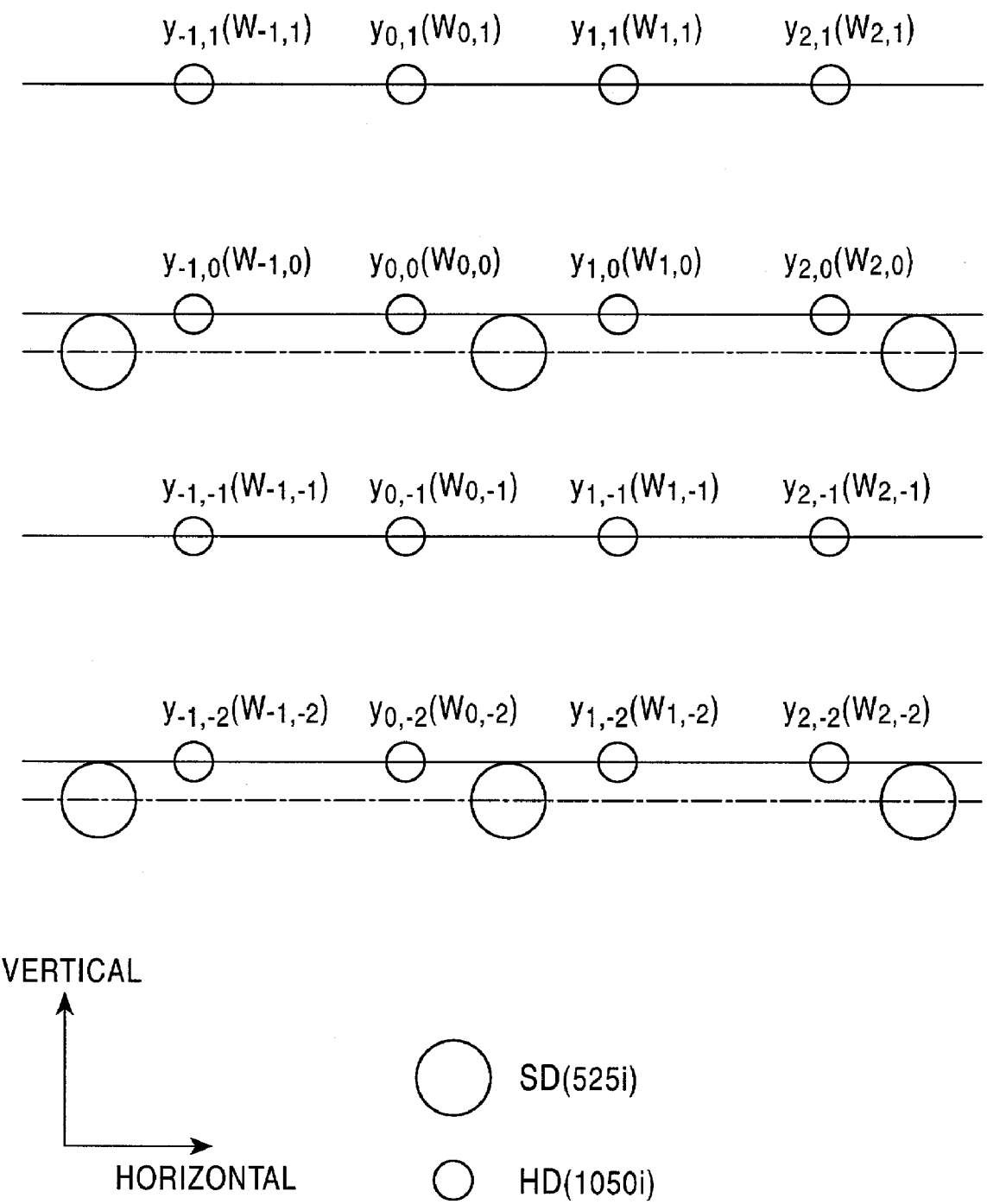
FIG. 11 is an illustration of coefficient data in coefficient-generating data stored in memory.

As described above, in the coefficient memory 133, nine types of coefficient data, $W_L$, $W_O$, $W_R$, $W_U$, $W_D$, $W_{LU}$, $W_{RU}$, $W_{LD}$, and $W_{RD}$, are stored beforehand. Each type of coefficient data is constituted by coefficient data corresponding to the four pixels in the 2-by-2-pixel-unit block corresponding to one pixel of SD pixel data. Accordingly, as FIG. 11 shows, the coefficient memory 133 stores pieces $W_{-1,1}$ to $W_{2,-2}$ of coefficient data which correspond to the 2-by-2-pixel block based on the input picture signal (525i signal) and which are used for obtaining (4×4=) sixteen pieces $Y_{-1,1}$ to $Y_{2,-2}$ of HD pixel data, although this is not described above.

Figure 12:
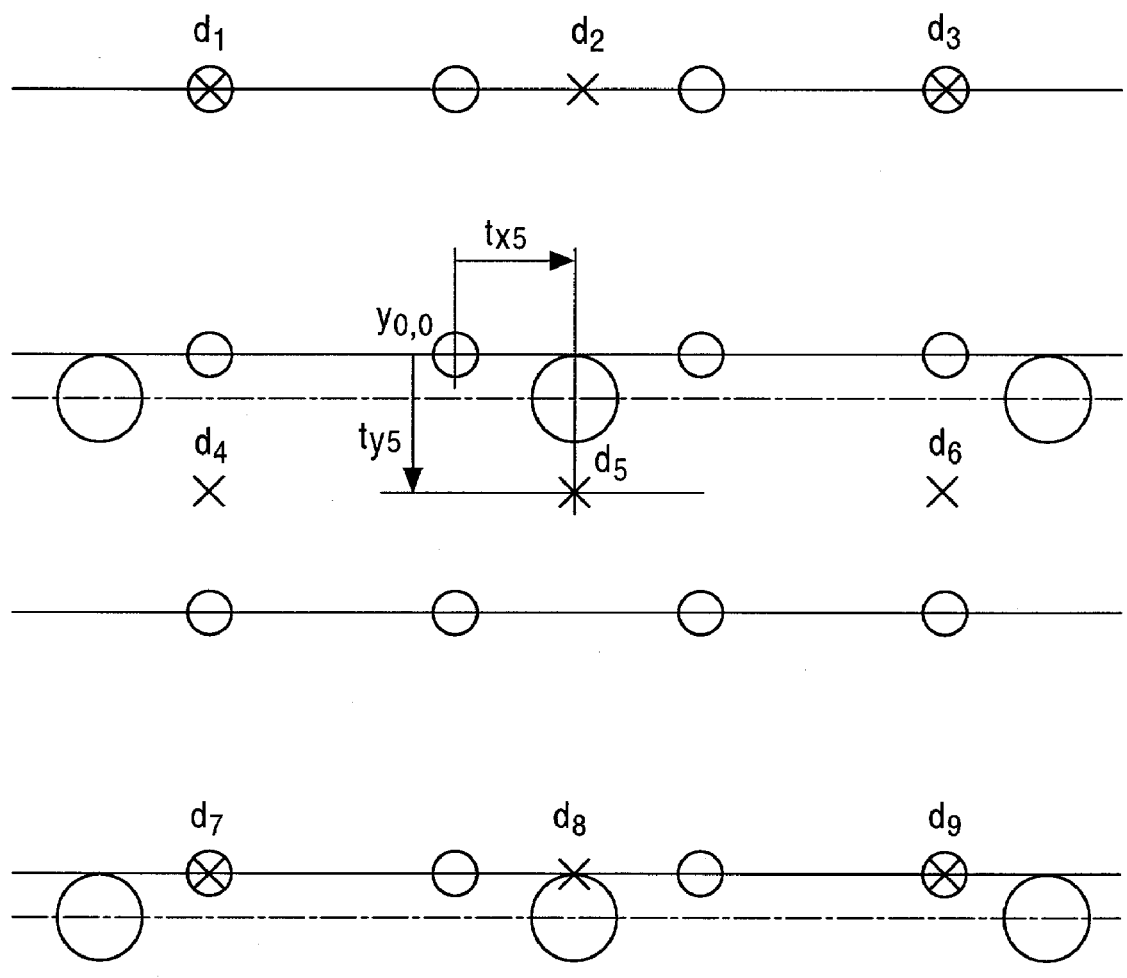
FIG. 12 is an illustration of the pieces $t_x$ and $t_y$ of phase information.

The above pieces $t_x$ and $t_y$ of phase information of each pixel respectively represent horizontal and vertical positions obtained when the HD pixel $y_{0,0}$ is used as a reference. When the magnification is, for example, 1.5 times, (3×3=) nine pieces $d_1$ to $d_9$ (indicated by the crosses in FIG. 12) of pixel data must be created for the 2-by-2-pixel block based on the input picture signal $V_{in}$, as shown in FIG. 12. The pieces $t_x$ and $t_y$ of phase information of the pixel data $d_9$ are $t_{x5}$ and $t_{y5}$, respectively, as shown in FIG. 12.

The coefficient combining circuit 135 calculates coefficient data $W_m$ by using the sixteen types of coefficients $W_{-1,1}$ to $W_{2,-2}$ stored in the coefficient memory 133 in the following expression:

$$W_m = a_{-1,1} \cdot W_{-1,1} + a_{0,1} \cdot W_{0,1} + a_{1,1} \cdot W_{1,1} + a_{2,1} \cdot W_{2,1} + \quad (19)$$
$$a_{-1,0} \cdot W_{-1,0} + a_{0,0} \cdot W_{0,0} + a_{1,0} \cdot W_{1,0} + a_{2,0} \cdot W_{2,0} +$$
$$a_{-1,-1} \cdot W_{-1,-1} + a_{0,-1} \cdot W_{0,-1} + a_{1,-1} \cdot W_{1,-1} +$$
$$a_{2,-1} \cdot W_{2,-1} + a_{-1,-2} \cdot W_{-1,-2} + a_{0,-2} \cdot W_{0,-2} +$$
$$a_{1,-2} \cdot W_{1,-2} + a_{2,-2} \cdot W_{2,-2}$$

Specifically, the coefficient data $W_m$ is found by linearly adding the coefficient data $W_{-1,1}$ to $W_{2,-2}$. The coefficient data calculated by the coefficient combining circuit 135 is supplied and stored in the coefficient memory 131.

The pieces $t_x$ and $t_y$ of the phase information of each pixel included in the unit-pixel block of the output picture signal $V_{out}$ calculated by the phase calculation circuit 136 are supplied to the phase-shift-filter generator 137. The phase-shift-filter generator 137 generates coefficients $a_{-1,1}$ to $a_{2,-2}$ in expression (19) for the pieces $t_x$ and $t_y$ of the phase information of each pixel included in the unit-pixel block of the output picture signal $V_{out}$.

The phase-shift-filter generator 137 determines the coefficients $a_{-1,1}$ to $a_{2,-2}$ by using a two-dimensional phase shift filter represented by the following expression:

$$f(x, y) = \frac{\sin((x - t_x)/K_x)}{(x - t_x)/K_x} \cdot \frac{\sin((y - t_y)/K_y)}{(y - t_y)/K_y} \quad (20)$$

In this case, for determining the coefficients $a_{-1,1}$ to $a_{2,-2}$ corresponding to a pixel, the pieces $t_x$ and $t_y$ of the phase information of the pixel are put into expression (20). In proportion to values obtained by integrating responses in a unit region (1×1) around sixteen positions as the grid points represented by $-1 \leq x \leq 2$, $-2 \leq y \leq 1$, the coefficients $a_{-1,1}$ to $a_{2,-2}$ are determined. In this case, the sum of the coefficients $a_{-1,1}$ to $a_{2,-2}$ in expression (20) is set to 1.

Here, a coefficient determining example is briefly described using the one-dimensional phase-shift filter represented by the following expression:

$$f(x) = \frac{\sin((x - t)/K)}{(x - t)/K} \quad (21)$$

Figure 13A:
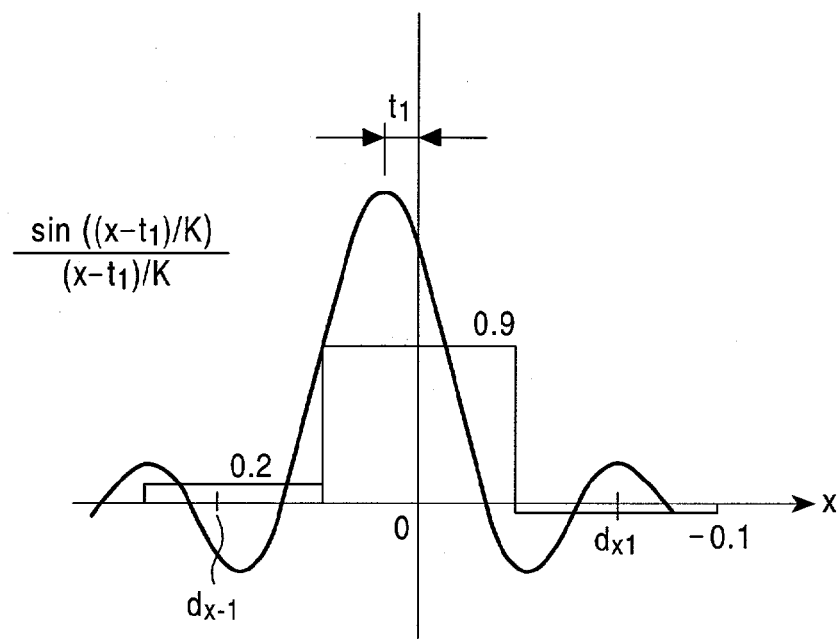
FIGS. 13A and 13B are graphs showing examples of determining coefficients.
Figure 13B:
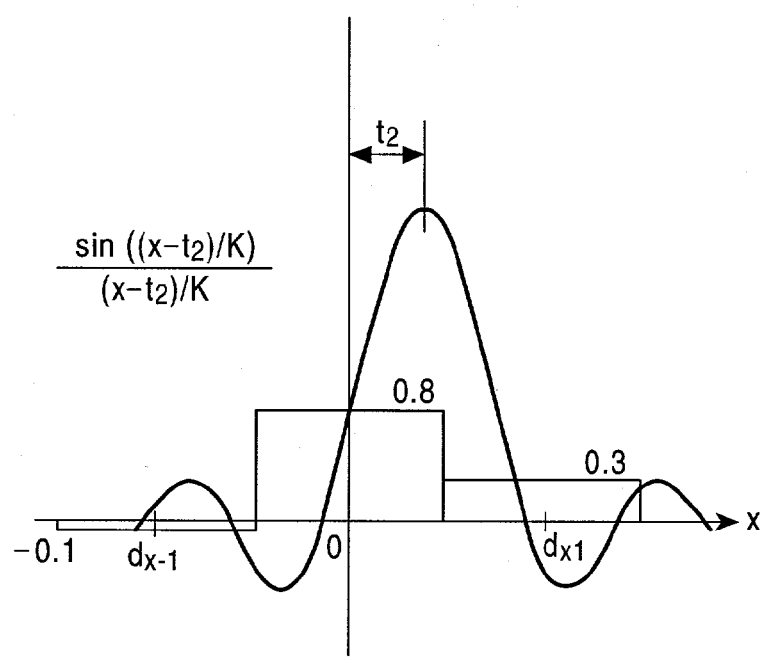

When the phase information $t = t_1$ ($t_1 < 0$) in this case, the filter characteristics are as shown in FIG. 13A. The coefficient $a_{-1}$ at the central pixel position 0, the coefficient $a_0$ at position $dx_{-1}$ that is left shifted by one pixel, and the coefficient $a_1$ at position $dx_1$ that is right shifted by one pixel are determined as 0.2, 0.9, and −0.1, respectively. In addition, in this case, when the phase information $t = t_2$ ($t_2 > 0$), the filter characteristics are as shown in FIG. 13B. The coefficient $a_{-1}$ at the central pixel position 0, the coefficient $a_0$ at position $dx_{-1}$ that is left shifted by one pixel, and the coefficient $a_1$ at position $dx_1$ that is right shifted by one pixel are determined as −0.1, 0.8, and 0.3, respectively.

As described above, the coefficients $a_{-1,1}$ to $a_{2,-2}$ of each pixel included in the unit-pixel block of the output picture signal $V_{out}$ are supplied to the coefficient combining circuit 135. The coefficient combining circuit 135 uses expression (19) to find the coefficient data $W_m$ for the data of each pixel included in the unit-pixel block of the output picture signal $V_{out}$. In this case, since the coefficient data $W_{-1,1}$ to $W_{2,-2}$ are stored in the coefficient memory 133, the coefficient combining circuit 135 calculates the coefficient data $W_m$ for each class.

In a coefficient data generator 132A, the coefficient data $W_m$ is generated for each vertical blanking period, and is stored in the coefficient memory 131.

The picture signal processor 110A shown in FIG. 10 is similar in structure to the picture signal processor 110 shown in FIG. 1.

Next, the operation of the picture signal processor 110A is described below.

From the 525i signal as the input picture signal $V_{in}$ stored in the buffer memory 109, the second tap-selecting circuit 122 selectively extracts the data (pixel data) of spatial class taps adjacent to each pixel (pixel of interest) in the unit-pixel block constituting the output picture signal $V_{out}$ to be generated. The data of the selectively extracted class taps is supplied to the spatial class detecting circuit 124. The spatial class detecting circuit 124 obtains requantized code $q_i$ as spatial class information (see expression (1)) by performing ADRC on the data of each pixel as the data of the spatial class taps.

From the 525i signal as the input picture signal $V_{in}$ stored in the buffer memory 109, the third tap-selecting circuit 123 selectively extracts the data (pixel data) of spatial class taps adjacent to each pixel (pixel of interest) in the unit-pixel block constituting the output picture signal $V_{out}$ to be generated. The data of the selectively extracted class taps is supplied to the motion class detecting circuit 125. The motion class detecting circuit 125 obtains motion class information MV from the data of each pixel as the data of the motion class tap data.

The motion information MV and the requantized code $q_i$ are supplied to a class combining circuit 126. From the motion information MV and the requantized code $q_i$, the class combining circuit 126 sequentially obtains (see expression (3)), for each unit-pixel block constituting the output picture signal $V_{out}$ to be generated, each class code CL representing the class to which each pixel (pixel of interest) in the unit-pixel block belongs. The class code CL is supplied as read-address information to the coefficient memory 131.

The coefficient data $W_m$ for each class that is used to obtain the data of each pixel included in the unit-pixel block of the output picture signal $V_{out}$ corresponding to the magnification of a displayed picture represented by parameter T is generated by the coefficient data generator 132A, and is stored in the coefficient memory 131.

By supplying the class code CL as read-address information to the coefficient memory 131, as described above, the coefficient data $W_i$ corresponding to the class code CL of each pixel included in the unit-pixel block of the output picture signal $V_{out}$ is read from the coefficient memory 131 and is supplied to an estimation predictive calculation circuit 127.

From the 525i signal as the input picture signal $V_{in}$ stored in the buffer memory 109, the first tap-selecting circuit 121 selectively extracts the data (pixel data) of a prediction tap. The prediction tap data is data (pixel data) adjacent to each pixel (pixel of interest) in the unit-pixel block constituting the output picture signal $V_{out}$ to be generated. The data $x_i$ of a prediction tap selectively extracted by the first tap-selecting circuit 121 is supplied to the estimation predictive calculation circuit 127.

By using the prediction tap data xi, and the coefficient data $W_i$ read from the coefficient memory 131, the estimation predictive calculation circuit 127 calculates each of data $y_1$ to data $y_P$ (where P represents the number of pixels in the unit picture block) of each pixel in the unit-pixel block constituting the output picture signal $V_{out}$ (see expression (4)). The data $y_1$ to data $y_P$ in the unit-pixel block constituting the output picture signal $V_{out}$ which are sequentially output from the estimation predictive calculation circuit 127 are supplied to a post-process circuit 129. The post-process circuit 129 outputs the data $y_1$ to data $y_P$ in 525i-signal format, and outputs a 525i signal as the output picture signal $V_{out}$.

As described above, by using the coefficient-generating data stored in the coefficient memory 133, the coefficient data $W_m$ for each class that is used to obtain the data of each pixel included in the unit-pixel block of the output picture signal $V_{out}$ corresponding to the magnification of a displayed picture represented by parameter T is generated by the coefficient data generator 132A in the picture signal processor 110A, and is stored in the coefficient memory 131. By using the coefficient data $W_i$ which is read for each class code CL from the coefficient memory 131, the estimation predictive calculation circuit 127 calculates data $y_1$ to $y_P$ of each pixel in the unit-pixel block constituting the output picture signal $V_{out}$. Accordingly, the user can change the magnification of the displayed picture to 1.0, 1.5, or 2.0 times as shown in FIG. 14 without storing many pieces of the coefficient-generating data in coefficient memory 133.

In the coefficient memory 133, coefficient data that is obtained in learning between a plurality of HD signals obtained with spatial shift filters and a fixed SD signal is stored as coefficient-generating data. By linearly adding pieces of the coefficient-generating data, the coefficient data generator 132A generates the coefficient data $W_m$ for obtaining the data of each pixel included in the unit-pixel block of the output picture signal $V_{out}$ corresponding to the magnification of the displayed picture represented by the parameter T. Therefore, the coefficient data $W_m$ is similar to coefficient data obtained in learning between the fixed SD signal and HD signals which are shifted by pixels so as to match the phase of each pixel included in the unit-pixel block of the output picture signal $V_{out}$, so that the output picture signal $V_{out}$ can be created with high precision.

For brevity of description, the TV receiver 100A shown in FIG. 10 has been described as an example that can change the magnification of the displayed picture to 1.0, 1.5, or 2.0 times. However, it is obvious that the structure of the TV receiver 100A can fine change the magnification of the displayed picture.

Although the parameter T representing the magnification of the displayed picture can be changed by the user in the above-described TV receiver 100A, it is possible that the number of horizontal pixels and the number of vertical pixels be changed by the user. Also in this case, similarly to the case of designating the magnification of the displayed picture, a unit-pixel block for an output picture signal corresponding to a predetermined pixel block of an input picture signal is found in accordance with the designation. The coefficient generator 132A finds the coefficient data $W_m$ for obtaining the data of each pixel included in the unit-pixel block.

In the above TV receiver 100A in FIG. 10, the coefficient data obtained in learning between a plurality of HD signals obtained by pixel shifting with spatial shift filters the fixed SD signal are used while being stored in the coefficient memory 132A included in the coefficient data generator 132A. However, coefficient data obtained in learning between a plurality of SD signals obtained by pixel shifting with spatial shift filters and a fixed SD signal can be used while being stored in the coefficient memory 133. In this case, $t_x$ and $t_y$ that are calculated as the phase information of each pixel included in the unit-pixel block of the output picture signal $V_{out}$ by the phase calculation circuit 136 are represented by horizontal and vertical positions obtained when the SD pixel at position (0, 0) is used as a reference.

Next, a third embodiment of the present invention is described below with reference to FIG. 15.

Figure 15:
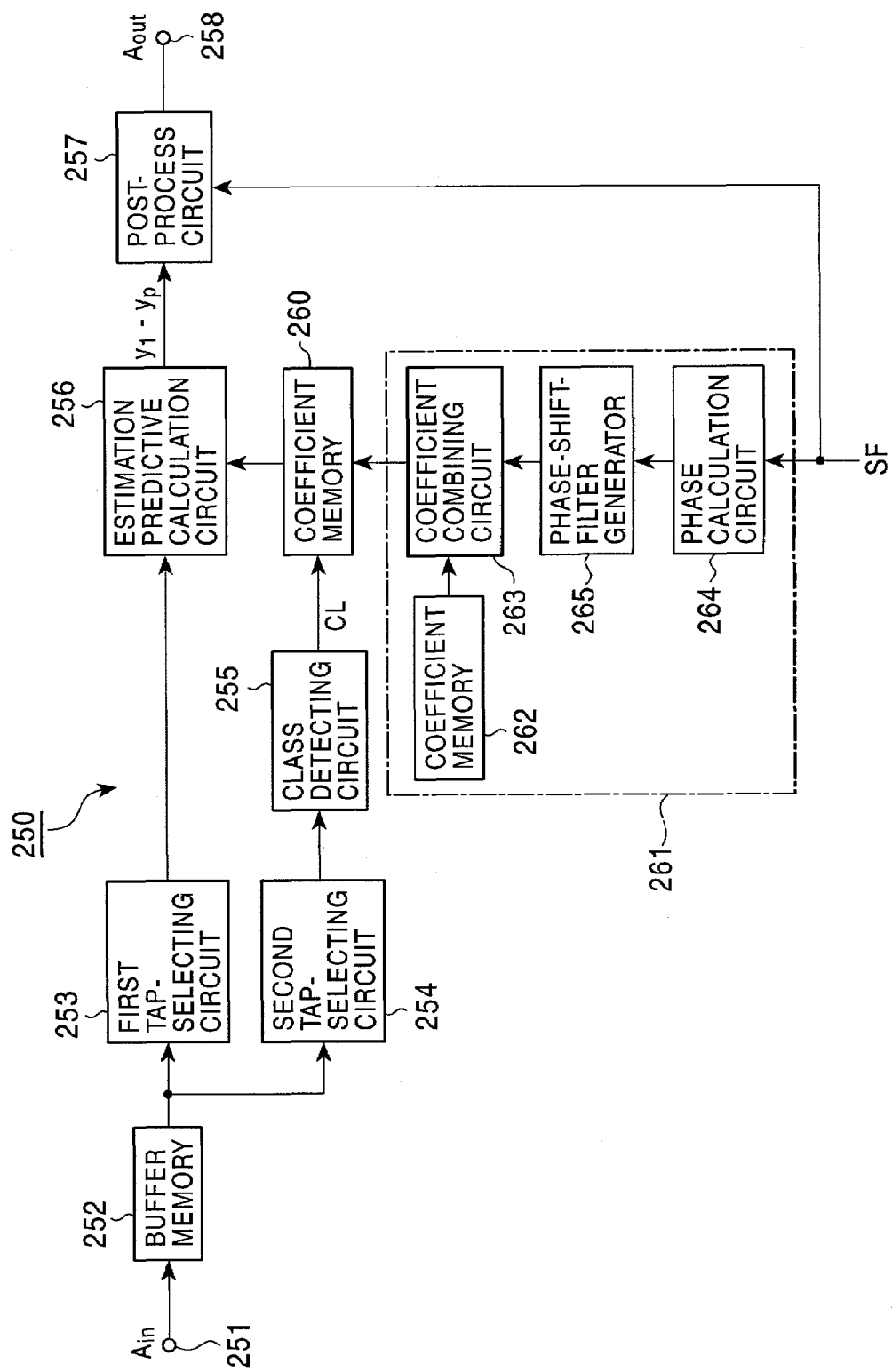
FIG. 15 is a block diagram showing an audio signal processing circuit according to a third embodiment of the present invention.

FIG. 15 shows the structure of an audio signal processing circuit 250 according to the third embodiment. The audio signal processing circuit 250 outputs the sampling frequency of an audio signal in converted form.

The audio signal processing circuit 250 includes an input terminal 251 from which an input audio signal $A_{in}$ as a sampling frequency $f_1$ is input, a buffer memory 252 for temporarily storing the input audio signal $A_{in}$, a first tap-selecting circuit 253 and a second tap-selecting circuit 245 that, from the input audio signal $A_{in}$ stored in the buffer memory 252, selectively extract a plurality of pieces of data which are adjacent to each piece of data (data of interest) in a unit-data block constituting an output audio signal $A_{out}$, and output the extracted pieces of data. The first tap-selecting circuit 253 selectively extracts data for use in prediction. The second tap-selecting circuit 245 selectively extracts data for use in classification.

The audio signal processing circuit 250 includes a class detecting circuit 255 that detects a level distribution pattern as a characteristic amount from the selectively extracted data and generates a class code CL based on the level distribution pattern.

The class detecting circuit 255 performs, for example, calculation that compresses 8-bit data into 2-bit data. The data compression is performed by performing ADRC. In this case, when among pieces of data, the maximum value is represented by MAX, the minimum value is represented by MIN, the dynamic range is represented by DR (=MAX−MIN+1), and the number of requantized bits is represented by P, a requantized code $q_i$ for each piece of data $q_i$ is obtained by using the following expression:

$$q_i = [(k_i - MIN + 0.5) \times 2^P / DR] \quad (22)$$

where the brackets represent truncation processing. When the number of pieces of data selected by the second tap-selecting circuit 254 is Na, i=1 to Na.

Based on the requantized code $q_i$ obtained as described above, the class detecting circuit 255 calculates the class to which each piece of data (data of interest) in the unit-data block constituting the output audio signal $A_{out}$ to be generated belongs by using the following expression:

$$CL = \sum_{i=1}^{Na} q_i (2^P)^i \quad (23)$$

The audio signal processing circuit 250 includes a coefficient memory 260. The coefficient memory 260 stores coefficient data for an estimation expression used by an estimation predictive calculation circuit 256 (described later). This coefficient data is information for converting the input audio signal $A_{in}$ into the output audio signal $A_{out}$. The class code CL output from the class detecting circuit 255 is supplied as address information to the coefficient memory 260. From the coefficient memory 260, coefficient data $W_i$ corresponding to the class code CL is read and supplied to the estimation predictive calculation circuit 256.

The audio signal processing circuit 250 includes a coefficient data generator 261 for generating coefficient data $W_m$ that is stored in the coefficient memory 260. Similarly to the coefficient data generator 132A in the picture signal processor 110A in FIG. 10, the coefficient data generator 261 includes a coefficient memory 262, a phase calculation circuit 264, a phase-shift-filter generator 265, and a coefficient combining circuit 263. The processing by the coefficient data generator 261 for generating the coefficient data $W_m$ is performed, for example, when the value of a parameter SF for designating the sampling frequency of the output audio signal $A_{out}$ is changed.

The coefficient memory 262 beforehand stores a plurality of pieces of coefficient-generating data that are obtained in, for example, learning between a learning signal corresponding to the input audio signal $A_{in}$ and a plurality of training signals that have a data position identical to that of the input audio signal $A_{in}$ or are forward and backward shifted by a predetermined number of pieces.

The coefficient combining circuit 135 calculates the coefficient data $W_m$ by using the plurality of pieces $W_{-2}$, $W_{-1}$, $W_0$, $W_1$, and $W_2$ of coefficient-generating data stored in the coefficient memory 262 in the following expression:

$$W_m = a_{-2}W_{-2} + a_{-1}W_{-1} + a_0 W_0 + a_1 W_1 + a_2 W_2 \quad (24)$$

In other words, the coefficient data $W_m$ is found by linearly adding the plurality of pieces $W_{-2}$, $W_{-1}$, $W_0$, $W_1$, and $W_2$ of coefficient-generating data. Here, the plurality of pieces $W_{-2}$, $W_{-1}$, $W_0$, $W_1$, and $W_2$ of coefficient-generating data are used to respectively obtain a piece of data positioned by two pieces of data before each piece of data of the input audio signal $A_{in}$, a piece of data positioned by one piece of data before the piece of data, a reference piece of data, a piece of data positioned by one piece after the piece of data, and a piece of data positioned by two pieces after the piece of data.

In response to the value of the parameter SF designating the sampling frequency of the output audio signal $A_{out}$, the phase calculation circuit 264 calculates the phase information $t_x$ of each data included in the unit-data block of the output audio signal $A_{out}$. For example, when the sampling frequency $f_2$ is 1.0, 1,5, and 2,0 times the sampling frequency $f_1$ of the input audio signal $A_{in}$, a set of two data blocks of the input audio signal $A_{in}$ corresponds to two data blocks of the output audio signal $A_{out}$, three data blocks of the output audio signal $A_{out}$, and four data blocks of the output audio signal $A_{out}$. The phase information $t_x$ of each data is information on a temporal shift with respect to the above reference piece of data of the input audio signal $A_{in}$.

The phase information $t_x$ of the data included in the unit-data block of the output audio signal $A_{out}$, which is calculated by the phase calculation circuit 264, is supplied to the phase-shift-filter generator 265. The phase-shift-filter generator 265 generates the coefficients $a_{-2}$ to $a_2$ in expression (24) in response to the phase information $t_x$. The phase-shift-filter generator 265 determines the coefficients $a_{-2}$ to $a_2$ by using, for example, the one-dimensional phase shift filter represented by expression (21). A coefficient determining method is similar to that used in the coefficient data generator 132A in FIG. 10.

The coefficients $a_{-2}$ to $a_2$ generated by the phase-shift-filter generator 265 are supplied to the above coefficient combining circuit 263. By using expression (24), the coefficient combining circuit 263 finds the coefficient data $W_m$ for obtaining each of the data in the unit-data block of the output audio signal $A_{out}$. In this case, since the coefficient data $W_{-2}$ to $W_2$ are stored for each class in the coefficient memory 262, the coefficient combining circuit 262 calculates the coefficient data $W_m$ for each class.

The audio signal processing circuit 250 also includes an estimation predictive calculation circuit 256 that, by using the data $x_i$ selectively extracted by the first tap-selecting circuit 253 and the coefficient data $W_i$ read from the coefficient memory 260, each of the data in the unit-data block constituting the output audio signal $A_{out}$. The estimation predictive calculation circuit 256 generates data constituting the output audio signal $A_{out}$ for each unit-data block. In other words, the data $x_i$ from the first tap-selecting circuit 253 which corresponds to each of the data (data of interest) in the unit-pixel block, and the coefficient data $W_i$ from the coefficient memory 260 which corresponds to each of the data constituting the unit-data block are supplied to the estimation predictive calculation circuit 256. The pieces $y_1$ to $y_P$ of the data constituting the unit-data block are separately calculated by using expression (4).

The audio signal processing circuit 250 includes a post-process circuit 257 that uses the sampling frequency $f_2$ designated by the parameter SF to output the pieces $y_1$ to $y_P$ of the data sequentially output from the estimation predictive calculation circuit 256, and an output terminal 258 that outputs the output audio signal $A_{out}$ that is output by the post-process circuit 257.

Next, the operation of the audio processing circuit 250 is described below.

From the input audio signal $A_{in}$ stored in the buffer memory 250, the second tap-selecting circuit 254 selectively extracts data adjacent to each of the data (data of interest) in the unit-data block constituting the output audio signal $A_{out}$ to be generated. The selectively extracted data is supplied to the class detecting circuit 255. The class detecting circuit 255 obtains a requantized code $q_i$ representing a level distribution pattern by performing ADRC on the supplied data. The class detecting circuit 255 calculates, based on the requantized code $q_i$, a class code CL representing the class to which each of the data (data of interest) in the unit-data block constituting the output audio signal $A_{out}$ to be generated. The class code CL is supplied as read-address information to the coefficient memory 260.

The coefficient data $W_m$ for each class for obtaining data included in the unit-data block of the output audio signal $A_{out}$ having a sampling frequency $f_2$ designated by the parameter SF is generated by the coefficient data generator 261, and is stored in the coefficient memory 260. The generation of the coefficient data $W_m$ is performed, for example, whenever the value of the parameter SF is changed.

By supplying the class code CL as read-address information to the coefficient memory 260, as described above, the coefficient data $W_i$ corresponding to the class code CL of each of the data included in the unit-data block of the output audio signal $A_{out}$ is read from the coefficient memory 260 and is supplied to an estimation predictive calculation circuit 256.

From the input audio signal $A_{in}$ stored in the buffer memory 252, the first tap-selecting circuit 253 selectively extracts data adjacent to each of the data (data of interest) in the unit-data block constituting the output audio signal $A_{out}$ to be generated. The selectively extracted data $x_i$ is supplied to the estimation predictive calculation circuit 256.

By using the data $x_i$, and the coefficient data $W_i$ read from the coefficient memory 260, the estimation predictive calculation circuit 256 calculates each of pieces $y_1$ to $y_P$ (where P represents the number of pieces of data in the unit-data block) of the data in the unit-data block constituting the output audio signal $A_{out}$. The pieces $y_1$ to $y_P$ of data are supplied to the post-process circuit 257. The post-process circuit 257 uses the sampling frequency $f_2$ designated by the parameter SF to output the pieces $y_1$ to $y_P$ of data, and the output audio signal $A_{out}$ having the sampling frequency $f_2$ is output to the output terminal 258.

As described above, by using the coefficient-generating data stored in the coefficient memory 262, the coefficient data generator 261 generates the coefficient data $W_m$ for each class that is used to obtain each of the data included in the unit-data block constituting the output audio signal $A_{out}$ having the sampling frequency $f_2$ designated by the parameter SF. The coefficient data $W_m$ is stored in the coefficient memory 260. By using the coefficient data $W_i$ that is read for the class code CL from the coefficient memory 260, the estimation predictive calculation circuit 256 calculates the pieces $y_1$ to $y_P$ of data in the unit-data block constituting the output audio signal $A_{out}$. Therefore, the user can arbitrarily change the sampling frequency $f_2$ of the output audio signal $A_{out}$ without storing many pieces of coefficient-generating data in the coefficient memory 262.

In the coefficient memory 262, pieces of coefficient data that are obtained in learning between a learning signal corresponding to the input audio signal $A_{in}$, and a plurality of training signals that are forward and backward shifted by a predetermined number of pieces of data are stored as pieces of coefficient-generating data. The coefficient data generator 261 is used to obtain each of the data included in the unit-data block of the output audio signal $A_{out}$ having the sampling frequency $f_2$ designated by the parameter SF by linearly adding a plurality of pieces of coefficient-generating data. Accordingly, the coefficient data $W_m$ is similar to that found in learning between a learning signal and a training signal shifted so as to match the phase of the data included in the unit-data block of the output audio signal $A_{out}$, so that the output audio signal $A_{out}$ can be generated with high precision.

Figure 16:
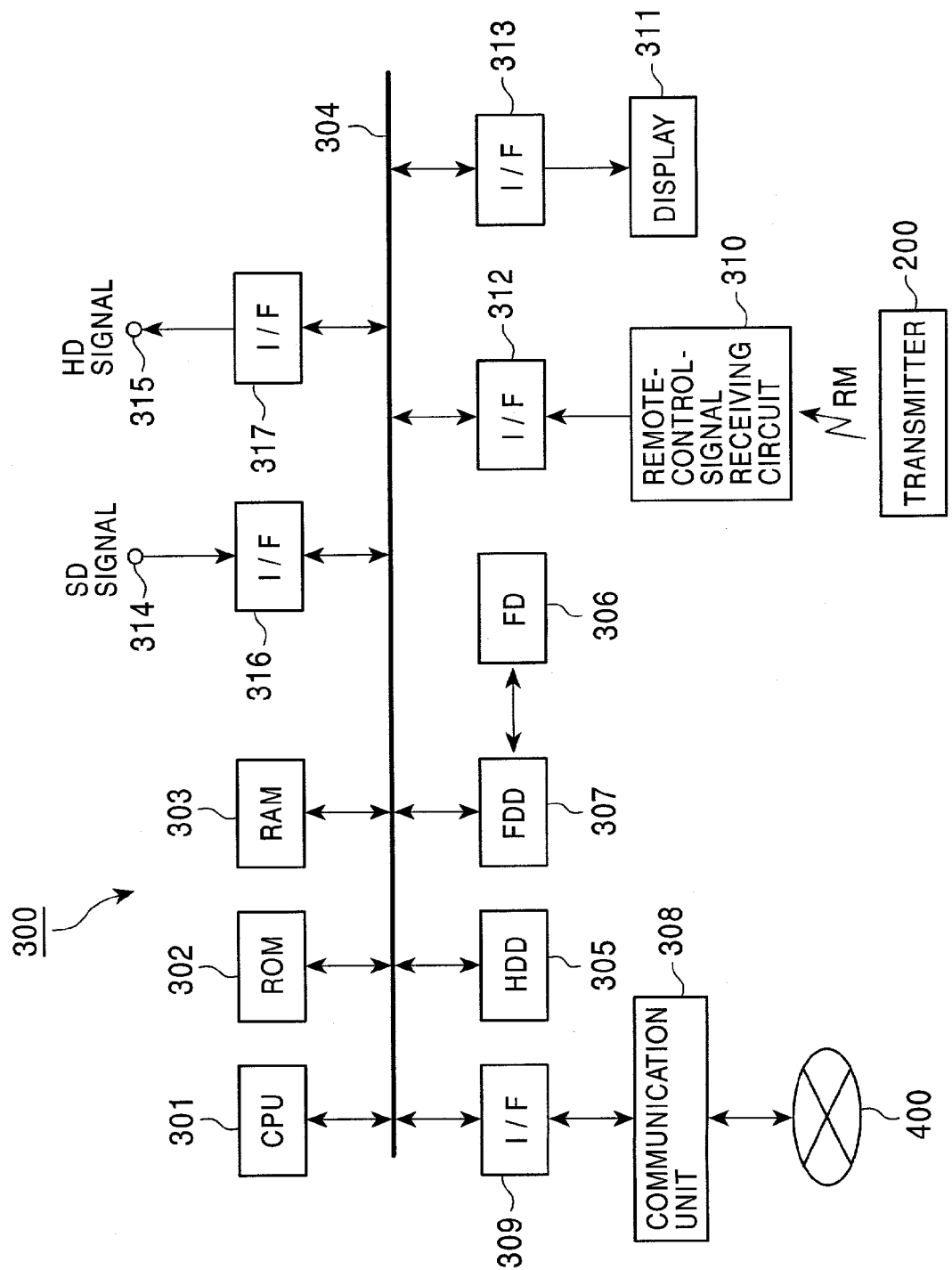
FIG. 16 is a block diagram showing a picture signal processor.

The processing by the picture signal processor 110 in FIG. 1 can be implemented in the form of software by a picture signal processor 300 as shown in FIG. 16.

First, the picture signal processor 300 in FIG. 16 is described below.

The picture signal processor 300 includes a CPU 301 for controlling the entire system of the picture signal processor 300, a ROM 302 for storing an operation program for the CPU 301, coefficient-generating data, etc., and a RAM 303 for use as an operating region for the CPU 301. The CPU 301, the ROM 302, and the RAM 303 are connected to a bus 304.

The picture signal processor 300 also includes a hard disk drive (HDD) 305 as an external storage unit, a floppy disk drive (FDD) 307 for driving a floppy disk 306. These drives 305 and 307 are connected to the bus 304.

The picture signal processor 300 includes a communication unit 308 for establishing a wired or wireless link to a communication network 400 such as the Internet. The communication unit 308 is connected to the bus 304 by an interface 309.

The picture signal processor 300 includes a user interface unit. The user interface unit includes a remote-control-signal receiving circuit 310 for receiving a remote control signal from a remote control transmitter 200, and a display 311 composed of a liquid crystal display. The receiving circuit 310 is connected to the bus 304 by an interface 312. The display 311 is similarly connected to the bus 304 an interface 313.

The picture signal processor 300 has an input terminal 314 from which an SD signal is input, and an output terminal 315 from which an HD signal is output. The input terminal 314 is connected to the bus 304 by an interface 316. The output terminal 315 is similarly connected to the bus 304 by an interface 317.

Instead of storing a processing program, coefficient data, etc., beforehand as described above, by downloading them from the communication network 400 such as the Internet via the communication unit 308, they can also be used while being stored in the HDD 305 or in the RAM 303. Alternatively, they may be provided by using the floppy disk 306.

In addition, instead of inputting an SD signal to be processed from the input terminal 314, the SD signal may be recorded in the HDD 305 beforehand, or may be downloaded from the communication network 400 such as the Internet via the communication unit 308. Also, instead of outputting an HD signal obtained after performing processing from the output terminal 315, the HD signal may be supplied in parallel to the display 311 for displaying a picture, may be stored in the HDD 305, and may be sent to the communication network 400 such as the Internet.

A process for obtaining the HD signal from the SD signal by the picture signal processor 300 shown in FIG. 16 is described below with reference to the flowchart shown in FIG. 17.

In step ST1, the process starts, and in step ST2, SD pixel data is input in units of frames or fields. When the SD pixel data is input from the input terminal 314, the SD pixel data is temporarily stored in the RAM 303. When the SD pixel data is recorded on a hard disk, the SD pixel data is read by the HDD 307 and is temporarily stored in the RAM 303. In step ST3, the process determines whether or not all the frames or all the fields of the input SD pixel data have been processed. If all the frames or all the fields of the input SD pixel data have been processed, the process proceeds to step ST4, and the process ends. If all the frames or all the fields of the input SD pixel data have not been processed yet, the process proceeds to step ST5.

In step ST5, the values of the parameters $Q_h$ and $Q_v$ input from the transmitter 200 by the user are read from, for example, the RAM 303. In step ST6, by using the coefficient-generating data, the coefficient data $W_m$ of the estimation expression (see expression (4)) for each class is generated (corresponding to processing by the coefficient data generator 132 in FIG. 1) which is used to obtain horizontal and vertical resolutions corresponding to the read values of the parameters $Q_h$ and $Q_v$.

In step ST7, by using the SD pixel data input in step ST2, the pixel data of class tap and prediction tap is acquired for each piece of HD pixel data to be generated. In step ST8, the process determines whether or not the processing of obtaining the HD pixel data has ended in all the fields of the input SD pixel data. If the processing has ended, the process returns to step ST2, and the SD pixel data of the next frame or field is input. If the processing has not ended, the process proceeds to step ST9.

In step ST9, a class code CL is generated from the SD pixel data acquired in step ST7. In step ST10, by using coefficient data corresponding to the class code and the SD pixel data of prediction tap in the estimation expression, HD pixel data is generated, and the process returns to step ST7 and repeatedly performs similar processing as described above.

Figure 17:
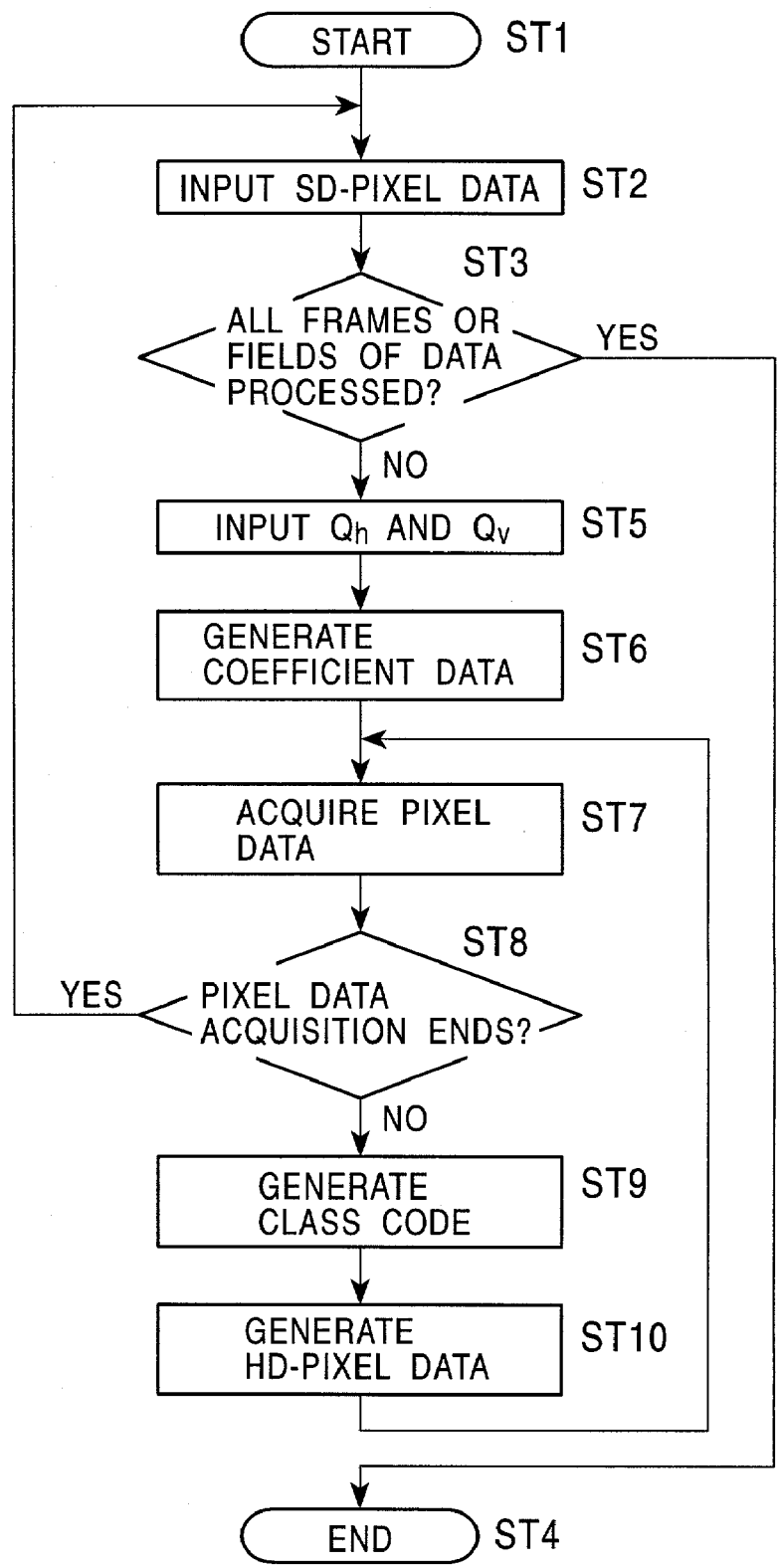
FIG. 17 is a flowchart showing a picture signal process.

By performing the process shown in the flowchart of FIG. 17 in the above manner, SD pixel data constituting the input SD signal is processed and HD pixel data constituting the HD signal can be obtained. As described above, the obtained HD signal is output from the output terminal 315, is supplied to the display 311 for displaying a picture, and is supplied and recorded in the HDD 305

In addition, the processing by the picture signal processor 110A shown in FIG. 10 can be implemented in the form of software by the picture signal processor 300 shown in FIG. 16.

A process for obtaining the output picture signal $V_{out}$ from the input picture signal $V_{in}$ by the picture signal processor 300 in FIG. 16 is described below with reference to the flowchart shown in FIG. 18.

The process starts in step ST11, and the input picture signal $V_{in}$ is input in units of frames or fields. When the input picture signal $V_{in}$ is input from the input terminal 314, pixel data constituting the input picture signal $V_{in}$ is temporarily stored in the RAM 303. When the input picture signal $V_{in}$ is recorded on the hard disk, the input picture signal $V_{in}$ is read by the HDD 307 and is temporarily stored in the RAM 303. In step ST13, the process determines whether or not all the frames or all the fields of the input picture signal $V_{in}$ have been processed. If all the frames or all the fields of the input picture signal $V_{in}$ have been processed, the process ends in step ST14. If all the frames or all the fields of the input picture signal $V_{in}$ have not been processed, the process proceeds to step ST15.

In step ST15, the pieces $t_x$ and $t_y$ of the phase information of each pixel included in the unit-pixel block of the output picture signal $V_{out}$ are generated which correspond to the magnification of the displayed picture which is represented by the value of the parameter T input from the transmitter 200 by the user. In step ST16, by using the pieces $t_x$ and $t_y$ of data and the coefficient-generating data of each class, the coefficient data $W_m$ of each estimation expression (see expression (4)) is generated (corresponding to the processing by the coefficient data generator 132A shown in FIG. 10) which is used to obtain the data of each pixel included in the unit-pixel block of the output picture signal $V_{out}$ corresponding to the magnification of the displayed picture which is represented by the parameter T.

In step ST17, from the pixel data of the picture signal $V_{in}$ input in step ST12, the pixel data of class tap and prediction tap is acquired for pixel data in the unit-pixel data constituting the output picture signal $V_{out}$ to be generated. In step ST18, the process determines whether or not processing of obtaining the pixel data of the output picture signal $V_{out}$ has ended in all the fields of the input picture signal $V_{in}$. If the processing has ended, the process proceeds to step ST12, and the input picture signal $V_{in}$ in the next frame or field is input. If the processing has not ended yet, the process proceeds to step ST19.

In step ST19, by using the pixel data of the class tap acquired in step ST17, the class code CL is generated. In step ST20, by using the coefficient data corresponding to the class code CL and the SD pixel data of prediction tap, the data of each pixel in the unit-pixel block constituting the output picture signal $V_{out}$ is generated based on the estimation expression. After that, the process proceeds to step ST17 and repeatedly performs similar processing.

Figure 18:
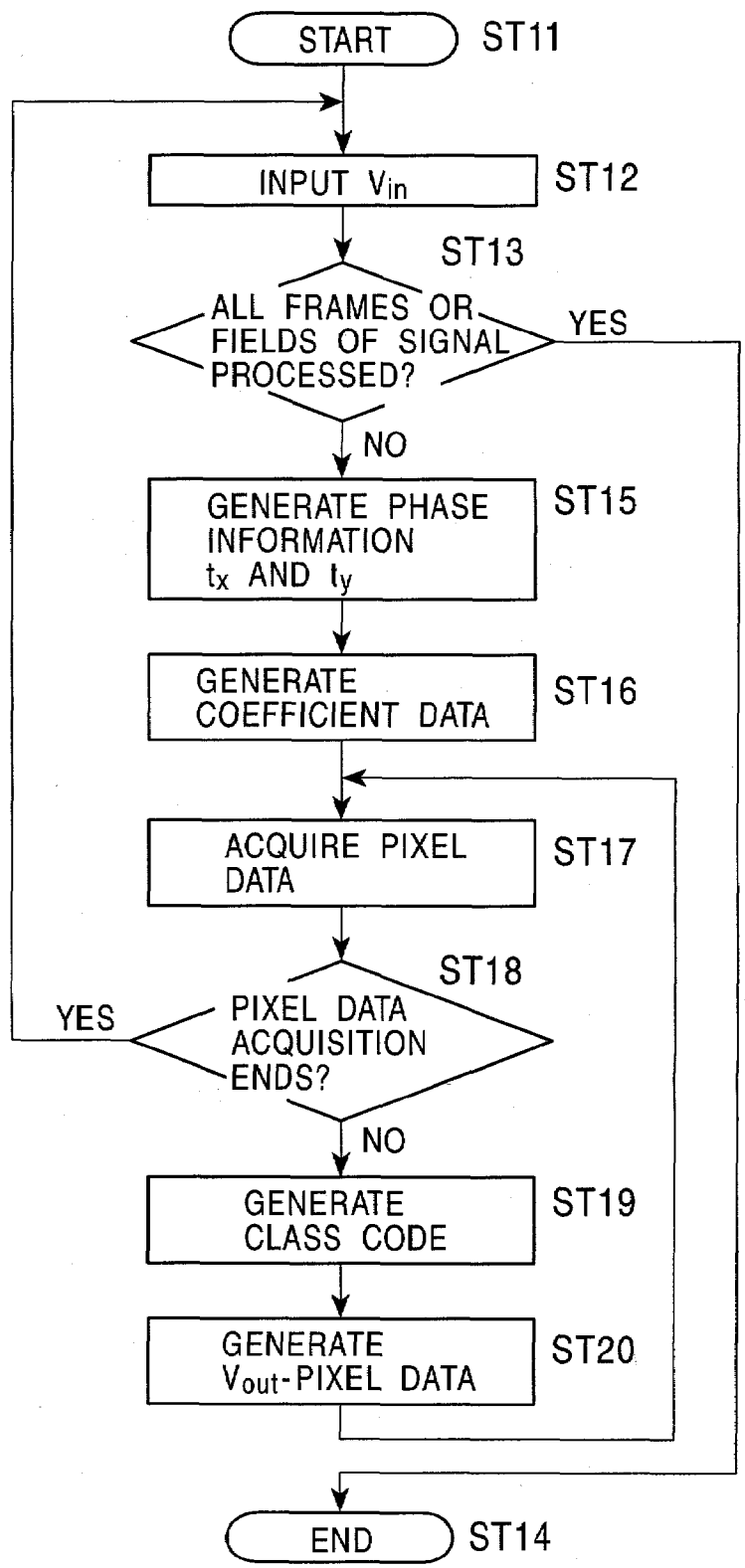
FIG. 18 is a flowchart showing another picture signal process.

By performing the process shown in FIG. 18 in the above manner, the pixel data of the input picture signal $V_{in}$ is processed and the pixel data of the output picture signal $V_{out}$ can be obtained. As described above, the obtained output picture signal $V_{out}$ is output from the output terminal 315, is supplied to the display 311 for displaying a corresponding picture, and is supplied to the HDD 305 so as to be recorded on the hard disk.

Also the processing by the audio signal processing circuit 250 shown in FIG. 15 can be implemented in the form of software by a processor similar in structure to the picture signal processor 300 shown in FIG. 16. The flow of the audio signal processing almost corresponds to that of the process shown in FIG. 18.

In this case, in step ST12, the input audio signal $A_{in}$ is input. In step ST15, the process generates the data $t_x$ of each of the data included in the unit-data block of the output audio signal $A_{out}$ having the sampling frequency $f_2$ designated by the value of the parameter SF input from the transmitter 200 by the user. In step ST16, by using the phase information $t_x$ of each of data in the unit-data block, and the coefficient-generating data of each class, the coefficient data $W_m$ of the estimation expression (see expression (4)) for each class is generated (corresponding to the processing by the coefficient data generator 261 shown in FIG. 15) which is used to obtain the data of the output audio signal $A_{out}$ having the sampling frequency $f_2$ designated by the value of the parameter SF. In step ST20, by using the coefficient data according to the class code and the data of the input audio signal $A_{in}$ which is adjacent to the data of the unit-data block, each of the data included in the unit-data block constituting the output audio signal $A_{out}$ is generated based on the estimation expression. In addition, processing by the coefficient data generator 150 shown in FIG. 9 can be implemented in the form of software, although drawing of a processor therefor is omitted.

A process for generating the coefficient-generating data is described below with reference to the flowchart shown in FIG. 19.

In step ST81, the process starts, and in step ST82, from a plurality of HD signals shifted by pixels, one HD signal is selected. In step ST83, the process determines whether or not processing of calculating the coefficient-generating data for all the HD signals has ended. If the processing has not ended, the process proceeds to step ST84.

In step ST84 HD pixel data corresponding to the selected HD signal is input in units of frames or fields. In step ST85, the process determines whether or not all the HD pixel data has been input. If the HD pixel data has not been input yet, the process proceeds to step ST87.

In step ST87, from SD pixel data corresponding to the fixed SD signal, the pixel data of class tap and prediction tap is acquired in response to the HD pixel data input in step ST84. In step ST88, the process determines whether or not the learning process has ended in all the regions of the SD pixel data corresponding to the fixed SD signal. If the leaning process has ended, the process returns to step ST84, and the next HD pixel data is input before repeatedly performing similar processing as described above. If the learning process has not ended yet, the process proceeds to step ST89.

In step ST89, from the SD pixel data acquired in step ST87, the class code CL is generated. In step ST90, the normalization equation (see expression (11) for obtaining the coefficient data is generated. After that, the process returns to step ST87.

In step ST85, if the HD pixel data has been input, the process proceeds to step ST91, and the coefficient data for each class is generated by using Gauss-Jordan's elimination method to solve the normalization equation. After that, the process returns to step ST82, the next HD signal is selected, and coefficient data for each class which corresponds to the next HD signal is found by repeatedly performing similar processing as described above.

In step ST83, if the calculation of the coefficient data for all the HD signals has ended, the process proceeds to step ST92, and the coefficient data for each class corresponding to all the HD signals is stored as coefficient-generating data in memory. After that, the process proceeds to step ST93 and ends.

Figure 19:
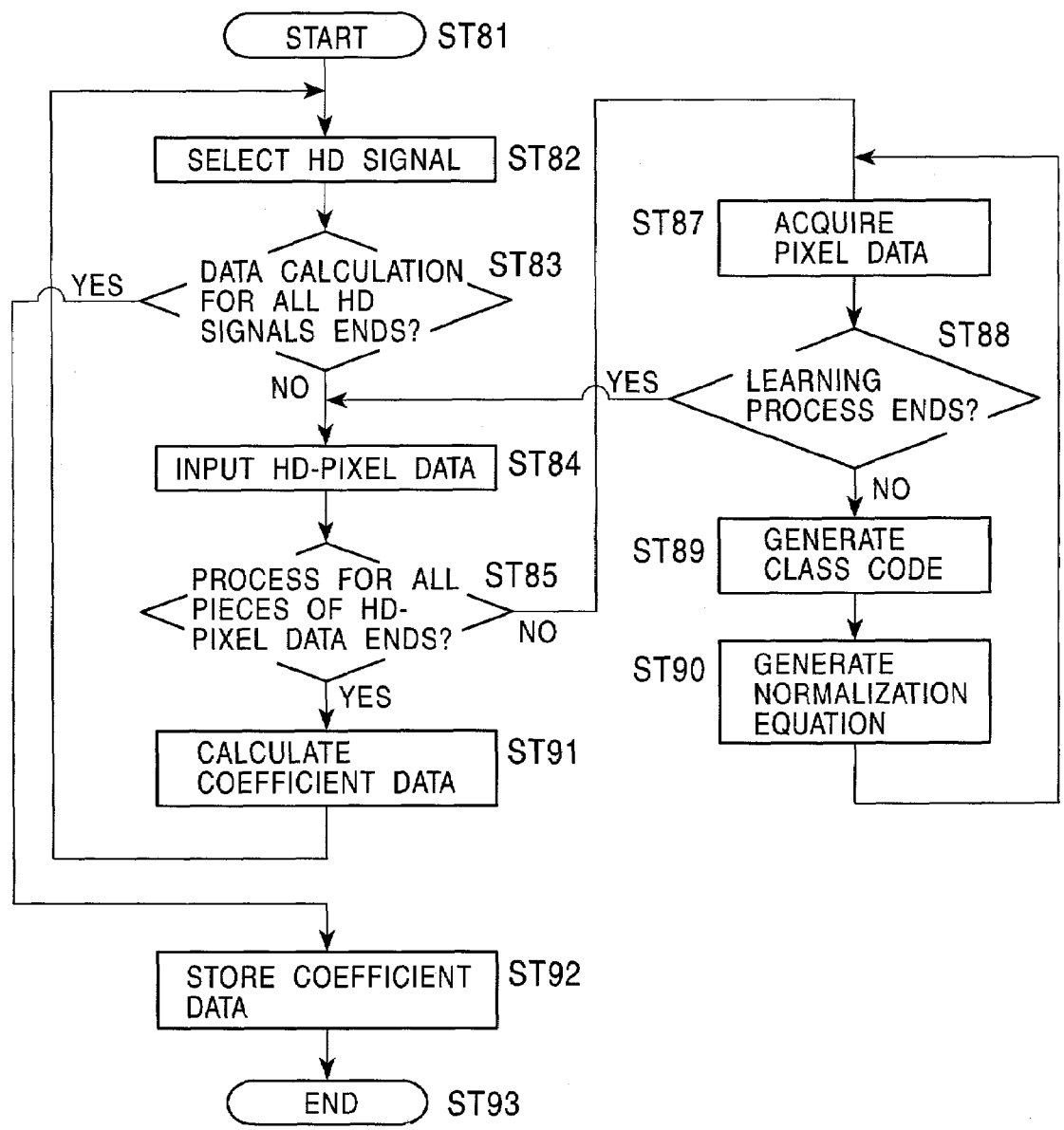
FIG. 19 is a flowchart showing a process for generating coefficient-generating data.
Figure 20:
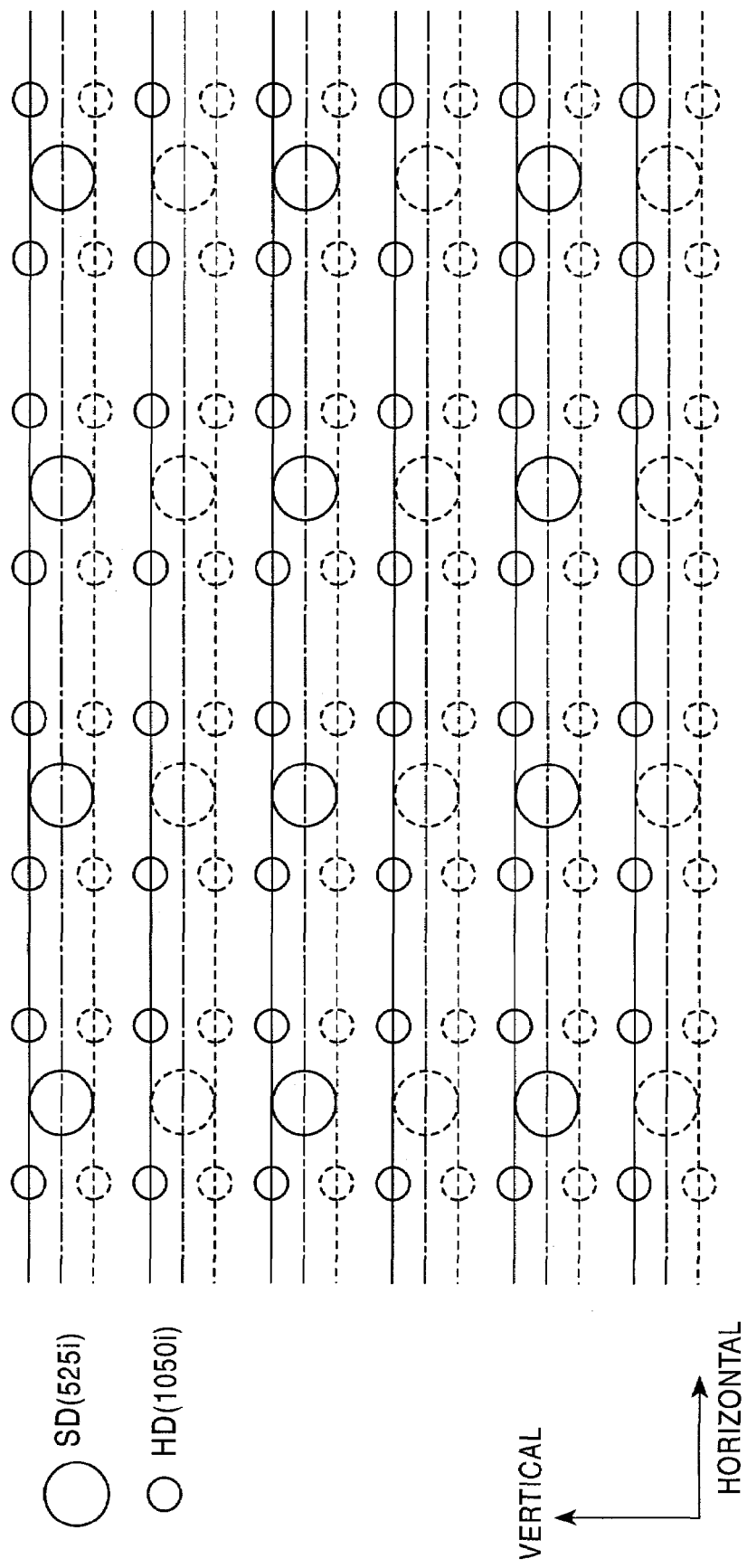
FIG. 20 is an illustration of a positional relationship of pixels between 525i signals and 1050i signals.

By performing the process shown in FIG. 19 in the above manner, a technique similar to that in the coefficient data generator 150 shown in FIG. 9 can obtain coefficient data for each class corresponding to all the HD signals shifted by pixels with spatial shift filters.

In the above embodiments, classification is performed. However, it is obvious that the present invention can be applied to a case in which classification is not performed.

What is claimed is:

1. A coefficient data generating apparatus for generating pieces of coefficient data for an estimation expression which are used when an input information signal composed of pieces of data is converted into an output information signal composed of pieces of data, said coefficient data generating apparatus comprising:
   storage means which stores coefficient-generating data for generating estimation-expression coefficient data which is used when a predetermined number of learning signals are converted into a predetermined number of training signals so that each piece of the coefficient-generating data corresponds to each of combinations of the learning signals and the training signals;
   transformation-relationship specifying means which represents relationships between the learning signals and the training signals in the form of transformation relationships representing relationships between signals generated by linearly transforming the learning signals and signals generated by linearly transforming the training signals, and which specifies each of the transformation relationships; and
   coefficient generating means which, by performing calculation using pieces of the coefficient-generating data stored in said storage means, in accordance with said transformation relationships, generates the coefficient data for the estimation expression which are used when the input information signal is converted into the output information signal.

2. A coefficient data generating apparatus according to claim 1, wherein said transformation relationships are represented by weighting coefficients which are applied to the learning signals and the training signals and which are used when a relationship between the input information signal and the output information signal is represented by using said relationships between the signals generated by linearly transforming the learning signals and the signals generated by linearly transforming the training signals.

3. A coefficient data generating apparatus according to claim 2, wherein said coefficient generating means uses said weighting coefficients to generate the coefficient data by linearly adding pieces of the coefficient-generating data.

4. A coefficient data generating apparatus according to claim 1, wherein:
   the input information signal, the output information signal, the learning signals, and the training signals are audio signals; and
   the output information signal has a sampling frequency higher than that of the input information signal.

5. A coefficient data generating apparatus according to claim 4, wherein the transformation relationships correspond to changes to the input information signal of the sampling frequency of the output information signal.

6. A coefficient data generating apparatus according to claim 5, wherein said coefficient generating means generates coefficient data corresponding to changes based on the transformation relationships in the sampling frequency.

7. A coefficient data generating apparatus according to claim 1, wherein:
   the input information signal, the output information signal, the learning signals, and the training signals are picture signals; and
   the output information signal represents a resolution higher than that represented by the input information signal.

8. A coefficient data generating apparatus according to claim 7, wherein the transformation relationships correspond to changes to the input information signal in the resolution represented by the output information signal.

9. A coefficient data generating apparatus according to claim 8, wherein said coefficient data generating means generates coefficient data corresponding to changes based on the transformation relationships in the resolution.

10. A coefficient data generating apparatus according to claim 1, wherein:
the input information signal, the output information signal, the learning signals, and the training signals are picture signals; and
the output information signal represents the number of pixels which is greater than that represented by the input information signal.

11. A coefficient data generating apparatus according to claim 10, wherein the transformation relationships correspond to changes to the input information signal in the number of pixels represented by the output information signal.

12. A coefficient data generating apparatus according to claim 11, wherein said coefficient generating means generates coefficient data corresponding to changes based on the transformation relationships in the number of pixels.

13. A coefficient data generating apparatus according to claim 10, wherein the transformation relationships correspond to the ratio of the number of pixels represented by the output information signal to that represented by the input information signal.

14. A coefficient data generating apparatus according to claim 13, wherein said coefficient generating means generates coefficient data corresponding to the ratio based on the transformation relationships of the number of pixels.

15. A coefficient data generating method for generating pieces of coefficient data for an estimation expression which are used when an input information signal composed of pieces of data is converted into an output information signal composed of pieces of data, said coefficient data generating method comprising the steps of:
representing a relationship between the input information signal and the output information signal by using transformation relationships representing relationships between signals generated by linearly transforming a predetermined number of learning signals and signals generated by linearly transforming a predetermined number of training signals, and specifying each of the transformation relationships; and
by performing calculation using pieces of coefficient-generating data for generating pieces of estimation-expression coefficient data which are used when the learning signals are converted into the training signals in accordance with combinations of the learning signals and the training signals, generating the pieces of coefficient data for the estimation expression which are used when the input information signal is converted into the output information signal.

16. An information providing medium for providing a computer program for executing a process for generating pieces of coefficient data for an estimation expression which are used when an input information signal composed of pieces of data is converted into an output information signal composed of pieces of data, said process comprising the steps of:
representing a relationship between the input information signal and the output information signal by using transformation relationships representing relationships between signals generated by linearly transforming a predetermined number of learning signals and signals generated by linearly transforming a predetermined number of training signals, and specifying each of the transformation relationships; and
by performing calculation using pieces of coefficient-generating data for generating pieces of estimation-expression data which are used when the learning signals are converted into the training signals in accordance with combinations of the learning signals and the training signals, generating the pieces of coefficient data for the estimation expression which are used when the input information signal is converted into the output information signal.

17. An information signal processing apparatus for converting a first information signal composed of pieces of input data into a second information signal composed of pieces of data, said information signal processing apparatus comprising:
an information signal processing apparatus first extraction means which, from said first information signal, extracts first data adjacent to data of interest corresponding to said second information signal;
a parameter input unit from which the value of a parameter representing a relationship between said first information signal and said second information signal is input;
coefficient-data generating means which retains pieces of coefficient-generating data and which, by linearly adding the pieces of coefficient-generating data, generates pieces of coefficient data for an estimation expression which are used when said first information signal is converted into said second information signal so that the generated coefficient data corresponds to the value of the parameter; wherein said coefficient-data generating means comprises:
storage means for storing the pieces of coefficient-generating data which respectively correspond to combinations of a predetermined number of learning signals and a predetermined number of training signals and which are pieces of coefficient data used when the learning signals are converted into the training signals;
transformation-relationship specifying means which represents a relationship between the first information signal and the second information signal by using transformation relationships as relationships between signals generated by linearly transforming the learning signals and signals generated by linearly transforming the training signals, and which specifies each of said transformation relationships; and
coefficient generating means which, by using said transformation relationships to perform calculation using the pieces of coefficient-generating data stored in said storage means, generates pieces of coefficient data for an estimation expression which are used when the first information signal is converted into the second information signal; and
calculation means which generates said second information signal by using the estimation expression to perform calculation using the coefficient data and the first data.

18. An information signal processing apparatus according to claim 17, wherein said transformation relationships are represented by weighting coefficients which are applied to the learning signals and the training signals and which are used when a relationship between the first information signal and the second information signal is represented by using said relationships between the signals generated by linearly transforming the learning signals and the signals generated by linearly transforming the training signals.

19. An information signal processing apparatus according to claim 18, wherein said coefficient generating means uses said weighting coefficients to generate the coefficient data by linearly adding pieces of the coefficient-generating data.

20. An information signal processing apparatus according to claim 17, wherein:
the first information signal, the second information signal, the learning signals, and the training signals are audio signals; and
the second information signal has a sampling frequency higher than that of the first information signal.

21. An information signal processing apparatus according to claim 20, wherein the transformation relationships correspond to changes to the first information signal of the sampling frequency of the second information signal.

22. An information signal processing apparatus according to claim 21, wherein said coefficient generating means generates coefficient data corresponding to changes based on the transformation relationships in the sampling frequency.

23. An information signal processing apparatus according to claim 17, wherein:
the first information signal, the second information signal, the learning signals, and the training signals are picture signals; and
the second information signal represents a resolution higher than that represented by the first information signal.

24. An information signal processing apparatus according to claim 23, wherein the transformation relationships correspond to changes to the first information signal in the resolution represented by the second information signal.

25. An information signal processing apparatus according to claim 24, wherein said coefficient data generating means generates coefficient data corresponding to changes based on the transformation relationships in the resolution.

26. An information signal processing apparatus according to claim 17, wherein:
the first information signal, the second information signal, the learning signals, and the training signals are picture signals; and
the second information signal represents the number of pixels which is greater than that represented by the first information signal.

27. An information signal processing apparatus according to claim 26, wherein the transformation relationships correspond to changes to the first information signal in the number of pixels represented by the second information signal.

28. An information signal processing apparatus according to claim 27, wherein said coefficient generating means generates coefficient data corresponding to changes based on the transformation relationships in the number of pixels.

29. An information signal processing apparatus according to claim 26, wherein the transformation relationships correspond to the ratio of the number of pixels represented by the second information signal to that represented by the first information signal.

30. An information signal processing apparatus according to claim 29, wherein said coefficient generating means generates coefficient data corresponding to the ratio based on the transformation relationships of the number of pixels.

* * * * *